US011451318B2

(12) United States Patent
Guan

(10) Patent No.: US 11,451,318 B2
(45) Date of Patent: Sep. 20, 2022

(54) OPTICAL LINE TERMINAL AND OPTICAL FIBER ACCESS SYSTEM WITH INCREASED FLEXIBILITY

(71) Applicant: Danmarks Tekniske Universitet, Kgs. Lyngby (DK)

(72) Inventor: Pengyu Guan, Nærum (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 0 days.

(21) Appl. No.: 17/278,534

(22) PCT Filed: Sep. 24, 2019

(86) PCT No.: PCT/EP2019/075606
§ 371 (c)(1),
(2) Date: Mar. 22, 2021

(87) PCT Pub. No.: WO2020/064672
PCT Pub. Date: Apr. 2, 2020

(65) Prior Publication Data
US 2021/0359780 A1 Nov. 18, 2021

(30) Foreign Application Priority Data
Sep. 24, 2018 (EP) ..................................... 18196265

(51) Int. Cl.
*H04J 14/02* (2006.01)
*H04B 10/2575* (2013.01)
(52) U.S. Cl.
CPC .... *H04J 14/0223* (2013.01); *H04B 10/25753* (2013.01); *H04J 14/0247* (2013.01); *H04B 2210/006* (2013.01); *H04J 2014/0253* (2013.01)
(58) Field of Classification Search
None
See application file for complete search history.

(56) References Cited

U.S. PATENT DOCUMENTS 5,453,871 A 9/1995 Kolner et al.
2002/0196491 A1* 12/2002 Deng .................. H04J 14/0226
398/79
(Continued)

FOREIGN PATENT DOCUMENTS

EP 3107306 A1 12/2016
JP 4252470 B2 4/2009
(Continued)

OTHER PUBLICATIONS

Min et al., "An OTDM-To-WDM Converter Using Optical Fourier Transformation", Jun. 2016, International Journal of Scientific & Technology Research vol. 5, Issue 06, pp. 62-65 (Year: 2016).*
(Continued)

*Primary Examiner* — David W Lambert
(74) *Attorney, Agent, or Firm* — Hamilton, Brook, Smith & Reynolds, P.C.

(57) ABSTRACT

The present disclosure relates to an optical line terminal that can be used in an optical fiber access system based on passive optical networks. The present disclosure further relates to a PON system; in particular the optical line terminal can be configured such that colourless components can be employed in a PON system using the optical line terminal and such that wireless communication can be directly employed in a PON system. One embodiment relates to an optical line terminal for a passive optical network, comprising at least a first transmitter for generating a time division multiplexed (TDM) optical carrier signal, said first transmitter comprising a first time lens optical signal processor configured to convert the TDM optical carrier signal to an wavelength division multiplexed (WDM) optical carrier signal for distribution to a plurality of users/ONUs, at least a second transmitter for generating a wavelength division multiplexed (WDM) downstream optical data signal for distribution to said plurality of users/ONUs, (Continued)

and at least one receiver for receiving and processing an upstream signal from said users.

17 Claims, 13 Drawing Sheets

(56) References Cited

U.S. PATENT DOCUMENTS

| | | | |
|---|---|---|---|
| 2003/0020984 A1* | 1/2003 | Bhatia | H04J 14/0209 398/87 |
| 2009/0083817 A1* | 3/2009 | Van Den Hoven | H04J 14/0246 725/116 |
| 2010/0142955 A1 | 6/2010 | Yu et al. | |
| 2010/0221011 A1 | 9/2010 | Pinceman et al. | |
| 2014/0301734 A1 | 10/2014 | Fang | |
| 2016/0197698 A1 | 6/2016 | Oxenlowe et al. | |
| 2020/0213027 A1 | 7/2020 | Guan et al. | |

FOREIGN PATENT DOCUMENTS

| | | |
|---|---|---|
| WO | 2015131908 A1 | 9/2015 |
| WO | 2016599 A1 | 7/2016 |
| WO | 2019048476 A1 | 3/2019 |

OTHER PUBLICATIONS

Mulvad et al., "DWDM-to-OTDM Conversion by Time-Domain Optical Fourier Transformation", 2011, Proceedings of the European Conference on Optical Communication (ECOC) 2011, pp. 1-3 (Year: 2011).*
U.S. Final Office Action for U.S. Appl. No. 16/644,110, entitled "Optical Line Terminal and Optical Fiber Access System With Increased Capacity," dated Jun. 25, 2021.
5G PPP, 5G Vision, Whitepaper, Feb. 2015.
Gao, Shiyu, "Impact of backreflections on single-fiber bidirectional wavelength-division-multiplexing passive optical networks (WDM-PONs)," pp. 1-94, 2013.
Guan et al., "128×2 GB/s WDM PON System with a Single TDM Time Lens Source using an AlGaAs-On-Insulator Waveguide," CLEO2018, SM2C.3.pdf, pp. 1-2 (2018).
Guan, et al., "Time Lens-Based Optical Fourier Transformation of All-Optical Signal Processing of Spectrally-Efficient Data," Journal of Lightwave Technology, vol. 35(4), pp. 799-806 (2017).
Guan, et al., "Highly Flexible WDM PON System with a Single TDM Time Lens Source Enabling Record 150 km Downstream Reach," OFC2018, Th2A.54.pdf, pp. 1-3 (2018).
Houtsma, Vincent and van Veen, Doutje, "A Study of Options for High-Speed TDM-PON Beyond 10G," JLT, 35(4), pp. 1059-1066 (2017).
Luo, et al.: "Time- and Wavelength-Division Multiplexed Passive Optical Network (TWDM-PON) for Next-Generation PON Stage 2 (NG-PON2)," JLT, 31(4), p. 587 (2013).
Myat Min, et al., "An OTDM-To-WDM Converter Using Optical Fourier Transformation," IJSTR 5(6), pp. 62-65 (2016).
Nakazawa, et al., "Ideal Distortion-Free Transmission Using Optical Fourier Transformation and Fourier Transform-Limited Optical Pulses," IEEE PTL, 16(4), pp. 1059-1061 (2004).
Nesset, Derek, "PON Roadmap [Invited]," IEEE J. Opt. Commun. Netw., 9(1), pp. A71-A76 (2017).
Ottaviano, et al., "Low-loss high-confinement waveguides and microring resonators in AlGaAs-on-insulator," Opt. Letters, 41(17), pp. 3996-3999 (2016).
Petrillo, Keith and Foster, Mark A., "Scalable 1.28-Tb/s Transmultiplexer Using a Time Lens," OSA/CLEO, JTul77.pdf, pp. 1-2 (2011).
Pu, et al., "Efficient frequency comb generation in AlGaAs-on-insulator," Optica, 3(8), pp. 823-826 (2016).
Wong, Elaine, "Next-Generation Broadband Access Networks and Technologies," IEEE JLT, 30 (4), pp. 597-608 (2012).
Xiao, et al., "Millimeter Wave Communications for Future Mobile Networks", IEEE JSAC, 35(9), pp. 1909-1935 (2017).
International Search Report and Written Opinion for International Application No. PCT/EP2018/073867 "Optical Line Terminal and Optical Fiber Access System With Increased Capacity," dated Oct. 25, 2018, consisting of 16 pages.
International Preliminary Report on Patentability for International Application No. PCT/EP2018/073867, entitled "Optical Line Terminal and Optical Fiber Access System With Increased Capacity," dated Mar. 19, 2020, consisting of 9 pages.
European Search Report for European Application No. 17189434, entitled "Optical Line Terminal and Optical Fiber Access System With Increased Capacity," dated Feb. 19, 2018, consisting of 7 pages.
Guan, et al., "Ultra-high-speed all-channel serial-to-parallel conversion based on complete optical fourier transformation," Published in the Proceedings of 2016 Optical Fiber Communications Conference and Exhibition, downloaded from DTU Library, orbit.dtu.dk on Sep. 8, 2021.
U.S. Non-Final Office Action for U.S. Appl. No. 16/644,110, entitled "Optical Line Terminal and Optical Fiber Access System With Increased Capacity," dated Dec. 16, 2020.

* cited by examiner

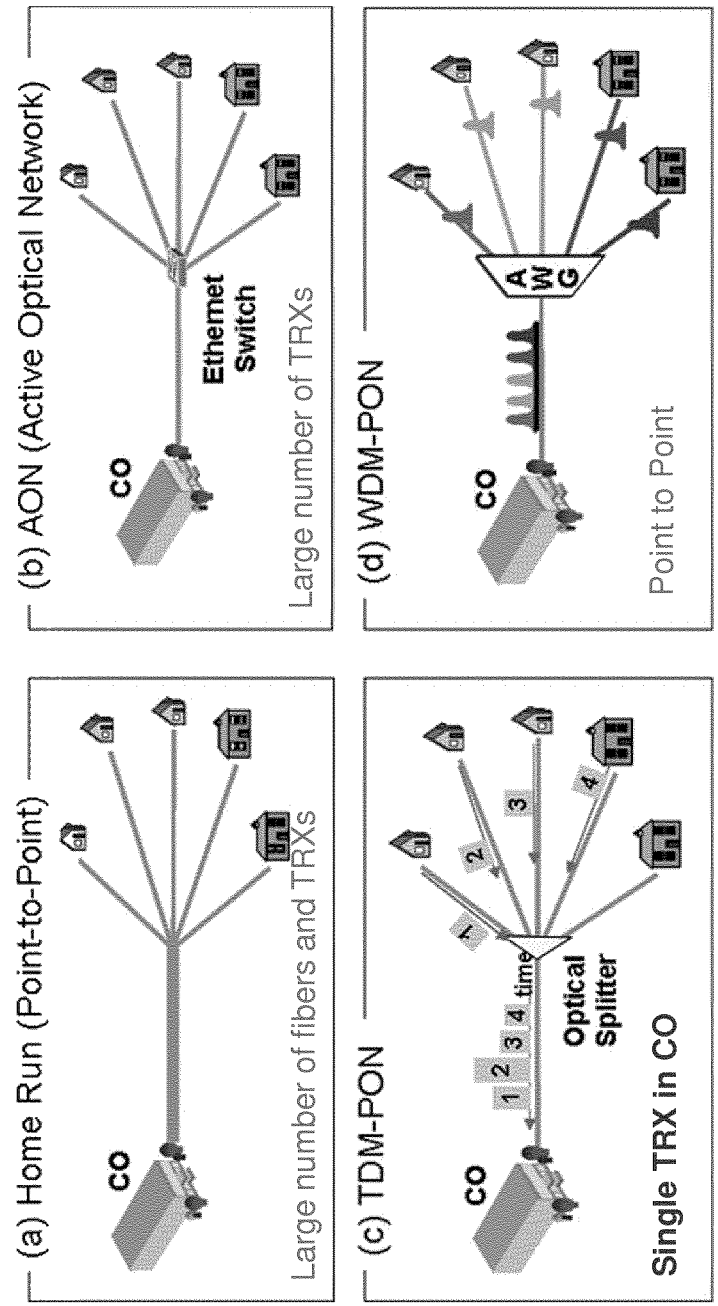
Fig. 1 – Prior art

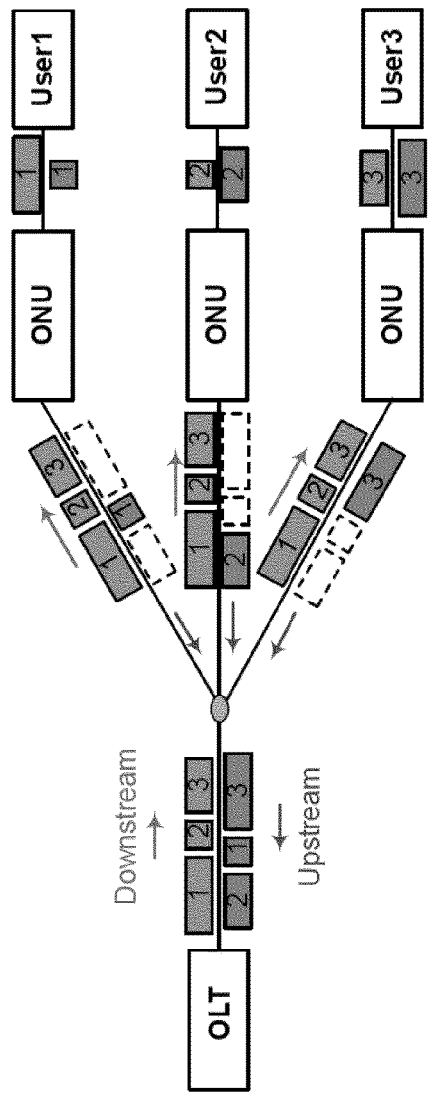
Fig. 2A – Prior art
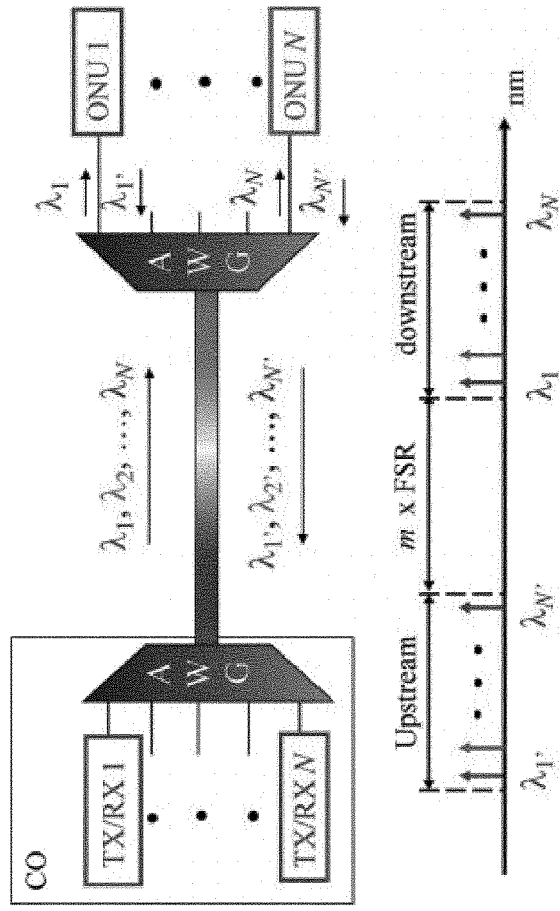
Fig. 2B – Prior art
PRIOR ART

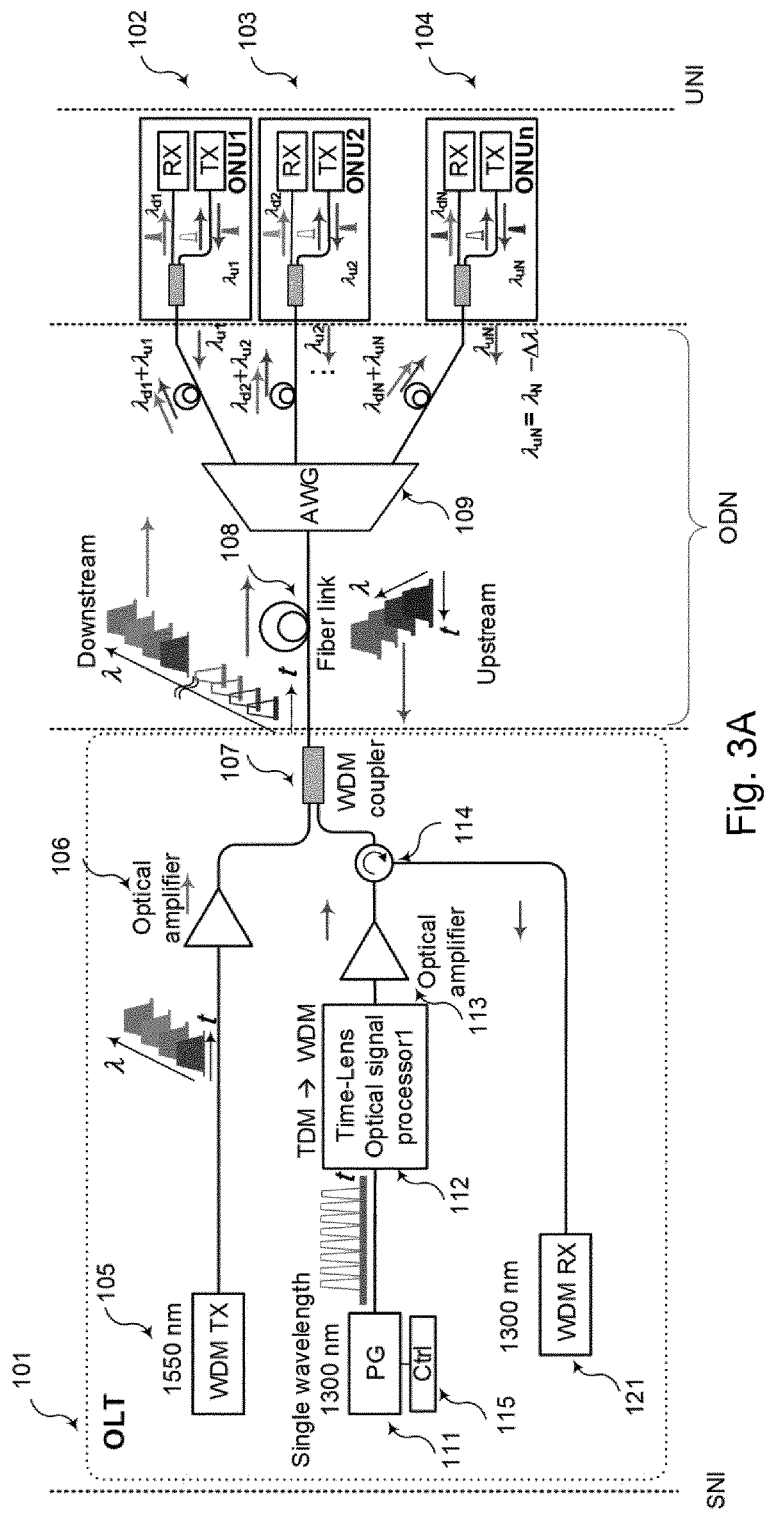
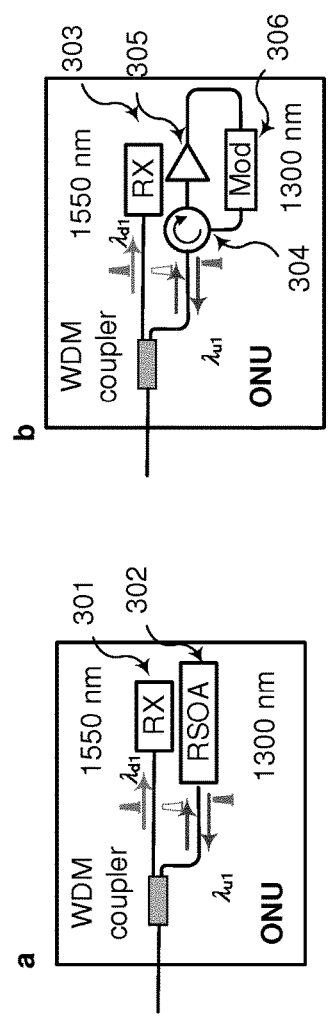
Fig. 3A
Fig. 3B
Fig. 3C

OPTICAL LINE TERMINAL AND OPTICAL FIBER ACCESS SYSTEM WITH INCREASED FLEXIBILITY

This application is the U.S. National Stage of International Application No. PCT/EP2019/075606, filed Sep. 24, 2019, which designates the U.S., published in English, and claims priority under 35 U.S.C. § 119 or 365(c) to European Application No. 18196265.5, filed Sep. 24, 2018. The entire teachings of the above applications are incorporated herein by reference.

The present disclosure relates to an optical line terminal that can be used in an optical fiber access system based on passive optical networks. The present disclosure further relates to a PON system; in particular the optical line terminal can be configured such that colourless components can be employed in a PON system using the optical line terminal and such that wireless communication can be directly employed in a PON system.

BACKGROUND OF INVENTION

The incessant rise in data consumption by both fixed and mobile broadband subscribers drives continuous industry innovation to meet this challenge. Optical fiber access systems based on passive optical networks (PON) are currently being deployed on a mass market scale by numerous network operators. PON systems are often referred to as the "last mile" between an internet service provider and an individual user, i.e. PON systems are typically used to provide fiber to the end consumer, normally using a point-to-multipoint architecture, wherein unpowered fiber optic splitters can be used to enable a single optical fiber to serve multiple end-points. The end-points are often individual users rather than commercial distributors.

Passive optical networks are "passive" in the way the networks typically do not use electrically powered components to split the signal. Instead, the signal is distributed using beam splitters. Each splitter typically splits the signal from a single fiber into 16, 32, or up to 256 fibers, depending on the manufacturer, and several splitters can be aggregated in a single cabinet. A beam splitter cannot provide any switching or buffering capabilities and does not use any power supply. Passive optical networks have both advantages and disadvantages over active networks. The complexities involved in keeping electronic equipment operating outdoors can be avoided. PON systems also allow for analog broadcasts, which can simplify the delivery of analog television. However, because each signal must be pushed out to everyone served by the splitter the requirements to the single downstream transmitter in the central office are high. The drivers behind PON systems nowadays are therefore high reliability, low cost, and passive functionality.

A PON can be based on Time-Division Multiplexing (TDM) that implements a point-to-multipoint architecture wherein the single downstream transmitter, referred to in here as an Optical Line Terminal (OLT), transmits data frames to all connected Optical Network Units (ONUs) over a shared optical fiber network. ONUs only see their own data through the address labels embedded in the signal. In the upstream direction, the OLT schedules ONU transmissions to avoid collisions between ONUs. A passive optical splitter/combiner enables the fiber to be divided to reach multiple customer locations, thereby keeping the optical distribution network passive, cf. FIGS. 1 and 2 where prior art PON systems are illustrated.

Passive optical network is therefore becoming the dominating technology in optical fibre access systems and fiber-to-the-home. Even though optical fibers have large bandwidth, current PON technology will run out of capacity in 4-5 years due to:
Growing number of subscribers
Growing number of connected devices per subscriber
Increasing bandwidth demands per device or application
Increasing the serial bitrate beyond 10 Gb/s of PON systems is difficult due to lower dispersion tolerance and the lower signal to noise ratio (SNR). This limits the maximum reach in the C-band of the dispersion uncompensated 25 Gb/s PON to 24 km and of 40 Gb/s PON to 10 km even with the dispersion tolerance enhanced duo-binary modulation [2]. Recently, ITU-T defined the second next generation PON (NG-PON2) standard for PON beyond 40-Gb/s, in which time and wavelength division multiplexed (TWDM) PON has been considered as the primary solution. A baseline TWDM-PON with 40 Gb/s aggregate capacity over 60 km SMF has been demonstrated [3]. The key challenge for TWDM-PON is to realize its optical network unit (ONU) at low cost, the cost is predicted to be more than 20 times that of a standard GPON (Gigabit-PON) ONU [1]. Another competitive candidate for NG-PON2 is the point-to-point (P2P) WDM-PON based on wavelength splitter optical distribution network, which has unique features including long reach, high bandwidth, security, high service level guarantees, easy network management and simple upgrade [4]. A major disadvantage of P2P WDM-PON is the large port count, transmitters and terminations at the central office (CO) requiring more CO space and operational cost.

A previous disclosure by the same inventor entitled "Optical line terminal and optical fiber access system with increased capacity" pending as PCT/EP2018/073867 presented a novel OLT structure and a novel passive optical network architecture that drastically increases the transmission capacity of optical access systems and improves the cost- and energy-efficiency of the downstream PON transmission. PCT/EP2018/073867 is hereby incorporated by reference in its entirety. However, for the upstream PON transmission, the performance is more or less the same as prior art WDM PON systems, which require wavelength tunable or wavelength specific components at each ONU. The use of such components is a key limitation for improving the cost- and energy-efficiency of upstream WDM-PON transmission.

Another issue within optical access systems is the integration between optical fiber and wireless communications. Radio-over-fiber (ROF) is currently considered as a promising solution for mobile front-/backhaul and for wireless distribution networks [9]. Additionally, the NG-PON2 standard has selected wavelength division multiplexing (WDM) as the key solution for mobile fronthaul and future 5G networks [1]. It is therefore paramount to seamlessly integrate WDM with conventional ROF architecture. However, each WDM-ROF data channel requires a separate optical wave for heterodyne up-conversion. Very accurate wavelength stabilization between the signal- and up-conversion lasers is required to maintain a stable wireless carrier frequency. For large data channel counts, the cost and complexity of this scheme may become a limitation for integrating optical and wireless communication in optical access systems.

SUMMARY OF INVENTION

A purpose of the present disclosure is to resolve the issues lined out above. The solution presented herein is to utilize and employ time-lens optical signal processing. A time-lens can expand and compress optical pulses while substantially retaining the temporal profile of the pulse. A time lens is based on the space-time duality of light: A quadratic phase modulation (PM) of a temporal waveform is analogous to the action of a thin lens on a spatial beam, hence the expression "time lens" (aka "time-lens"). By combining a time lens with suitable dispersion media an optical Fourier transformation (OFT) can be realized as exemplified herein. Time lens based OFT has further been shown to be a very versatile and powerful tool for ultrafast optical signal processing. It can be applied to transfer the temporal profile of an optical signal into the frequency domain and vice-versa. The presently disclosed principle is generally based on the idea of using a time-lens based optical signal processor for optical signal conversion between time division multiplexing (TDM) and wavelength division multiplexing (WDM)—and vice versa.

The previously disclosed time-lens application was primarily directed to increasing the downstream transmission capacity of the network by relating to an optical line terminal for a passive optical network employing the presently disclosed OLT structure. I.e. comprising at least one transmitter for generating a time division multiplexed (TDM) downstream optical data signal, and a first time lens optical signal processor configured to convert the downstream TDM signal to a downstream WDM signal for distribution to a plurality of users. Typically at least one receiver for receiving and processing an upstream signal from said users is part of the OLT as well. The time-lens based optical processor may convert the TDM signal generated in the OLT into a number of WDM channels, typically of low baud rate. These can be directly demultiplexed, e.g. by a conventional passive AWG, and send to individual Optical Network Units (ONU) on the user side with a low fixed loss, typically less than 4 dB loss. At the individual ONU side, the separated WDM channel can be received by a base rate receiver, resulting in much better receiver sensitivity, typically on the order of 10 dB for 32 subscribers. This can be achieved with even lower power consumption than hitherto known. The downstream capacity can even be further increased by using a time-lens based optical signal processor for optical signal conversion between M-wavelength TWDM and N-wavelength WDM signals, where M typically is less than N. This application of the time lens principle might realize approx. 10 times more data rate on optical access communication network—more cost-efficient and energy-efficient than the prior art solutions. Point to multi-point, few point to multi-point and multi-point to multi-point schemes can be realized by applying the optical time-lens principle to PON systems.

The present disclosure presents a novel application of the time lens principle, i.e. time-lens optical signal processing (OSP), that can be applied for both upstream PON transmission and for wireless communication. A first embodiment relates to an optical line terminal for a passive optical network, comprising at least a first transmitter for generating a time division multiplexed (TDM) optical carrier signal, said first transmitter (i.e. signal generator) comprising a first time lens optical signal processor configured to convert the TDM optical carrier signal to an wavelength division multiplexed (WDM) optical carrier signal for distribution to a plurality of users/ONUs. It is this carrier signal that can be used for the upstream transmission, i.e. the carrier signal is brought to the ONUs. The TDM optical carrier signal is an optical signal comprising optical pulses that are assigned to different specific time slots, i.e. like a pulse train, but no data is modulated into the carrier signal, neither the TDM carrier signal not the WDM carrier signal. In that regard it makes sense to use the term "unmodulated optical signal" herein to characterize the optical carrier signal, wherein the term "unmodulated" refers to "no data modulation". At each ONU the carrier signal can be modulated and sent back to the OLT as an upstream optical data signal, i.e. going upstream the original "unmodulated" carrier signal has been modulated with data to become an upstream optical data signal. No light sources are thereby needed in the ONU. The optical line terminal may further comprise at least a second transmitter for generating a wavelength division multiplexed (WDM) downstream optical data signal for distribution to said plurality of users/ONUs. The WDM downstream optical data signal is a data signal, i.e. it is modulated—in contrast to the "unmodulated" optical carrier signal. At least one receiver can also be provided for receiving and processing an upstream optical data signal from said users/ONUs.

The optical carrier signal can be used for generating an upstream signal in the ONU by modulating the carrier signal and sending it back (upstream) thereby avoiding the use of light sources in the ONU. Hence, the present disclosure further relates to a passive optical network (PON) system comprising the OLT described herein. The PON system may optionally comprise an optical fiber infrastructure for distributing the downstream and upstream signals. A plurality of optical network units (ONU) can be provided in the system, preferably one for each end user, the ONUs comprising at least one remote node for splitting the downstream WDM optical data signal and the WDM optical carrier signal into separate wavelength signals such that each ONU receives a downstream optical data signal at a first specific wavelength and an optical carrier signal at a second specific wavelength, where the optical carrier signal does not contain data. With a receiver for receiving and processing the downstream optical data signal and an upstream signal generator for receiving and modulating the optical carrier signal, an upstream optical data signal can be generated in each ONU which can be combined with the other upstream data signals, sent back through the fiber infrastructure and received and processed in the OLT. A major cost advantage of such a setup is that each ONU can be made colourless, i.e. instead of having wavelength specific transmitters in each ONU, the same ONU can be used all over the system, because the wavelength of each upstream signal is determined and controlled by the OLT. The upstream signal generator of an ONU can for instance comprise a reflective semiconductor optical amplifier and/or an optical circulator, amplifier and modulator for receiving, amplifying and modulating the optical carrier signal.

But the inventor has further realized that with the help of a time-lens optical signal processing the optical carrier signal can be ingeniously configured such that it can also be used for directly generating RF signals for use in wireless communication. Hence, the present disclosure further relates to a passive optical network (PON) system comprising the OLT described herein. A plurality of optical network units (ONU) can be provided in the system, preferably one for each end user, the ONUs comprising at least one remote node for splitting the downstream WDM optical data signal and the WDM optical carrier signal into separate wavelength signals such that each ONU receives a downstream optical data signal at a first specific wavelength and an optical carrier signal at a second specific wavelength. And the ONUs can then be configured for generating a radio frequency (RF) data signal for wireless communication based on the frequency difference between the first and second wavelengths. And the carrier signal generated in the OLT can still be used for upstream transmission because part of each optical carrier signal can be used for generating the RF data signal for wireless communication and another part of the optical carrier signal can be used for generation of an upstream optical data signal as exemplified above.

The inventor has further realized that a pair data and carrier signals can also be utilized for employing commercial coherent receivers without the usual additional local oscillator. Such a pair of data and carrier signals can be received directly by an off-the-shelf coherent receiver, when the frequency difference between the WDM data channel and the WDM carrier is within the bandwidth limit of the coherent receiver—and this can be controlled by the configuration of the time-lens optical signal processor. Hence, the present disclosure further relates to a PON system as disclosed here wherein at least one (or each of) ONU comprises a coherent receiver, and wherein at least part of the optical carrier signal is used along with the downstream optical data signal for receiving the downstream optical data signal in the coherent receiver.

The presently disclosed time-lens approach also provides for different modulation formats to be used on different WDM data channels. This is exemplified in FIG. 13 where four different TDM signals use QPSK, BPSK, 8-QAM and 16-QAM, respectively. A time-lens signal processor can convert all these different modulation formats to WDM channels and maintain the respective modulation format in the conversion.

Applying the presently disclosed novel time lens approach to upstream PON transmission the use of wavelength tunable/specific components can be avoided and it can greatly improve the cost- and energy-efficiency of upstream transmission. With the application to wireless transmission a transmitter structure can be provided that is capable of seamlessly generating any combination of WDM-ROF channels and regular optical WDM channels. The presently disclosed OFT allows the simultaneous generation of a number of WDM channels and dynamically assigning up-conversion tones to the ones targeting a remote antenna unit. 12×2.5-Gb/s OOK and 10×4-Gb/s QPSK hybrid transmission are demonstrated in the experimental example disclosed herein over 100-km SSMF plus 0.5 m wireless distance. This is the highest number of WDM-ROF channels generated from a single laser and modulator.

The presently disclosed OLT structure allows generation of a large number of WDM channels from a single TDM signal source, in fact the time-lens OFT approach for PON presented herein can be tuned such that all individual signals in a TDM signal can be converted to a specific wavelength in the WDM signal—and this can be provided over a broad wavelength interval, such as the entire C-band (1530 to 1565 nm), L-band (1565-1620 nm) or C+L-band or parts thereof. The frequencies of all the generated WDM channels can be frequency-locked with each other, and the frequency grid as well as the wavelength allocation can be tuned through the OFT without separate control of all the laser frequencies as in a conventional WDM PON, i.e. rather simply compared to conventional WDM PON.

The presently disclosed OLT structure and PON architecture are highly flexible in terms of wavelength allocation, as it allows tuning of the signal wavelength in sub nanoseconds by encoding (remapping) the TDM signal in time-domain, without tuning the actual wavelength of the optical source. And each individual signal in the TDM signal can be mapped to a specific wavelength in the WDM signal. The presently claimed invention can therefore not only increase the capacity of PON systems, but also have the flexibility of TDM-PON and the transmission performance of WDM-PON.

DESCRIPTION OF DRAWINGS

The following symbols are used in the drawings:
OLT (Optical Line Terminal): PON head-end, typically located in a central office.
ONU (Optical Network Unit): User side PON equipment.
ODN (Optical Distribution Network): Optical fiber infrastructure connecting OLT to ONUs.
SNI (Service Node Interface): Interface to the Metro/Core Network.
UNI (User Network Interface): Interface to the user network.
CR (Clock recovery): to synchronize the optical signal processor 2.

FIGS. 1A-D show four examples of prior art optical access systems.

FIG. 2A shows an example of the architecture of a prior art TDM-PON system.

FIG. 2B shows an example of the architecture of a prior art WDM-PON system.

FIG. 3A illustrates an example of WDM-PON architecture for upstream transmission using the time-lens principle and colourless components.

FIG. 3B illustrates an ONU structure using only colourless components based on a reflective semiconductor optical amplifier.

FIG. 3C illustrates an ONU structure using only colourless components based on a circulator.

DETAILED DESCRIPTION OF THE INVENTION

Figure 4:
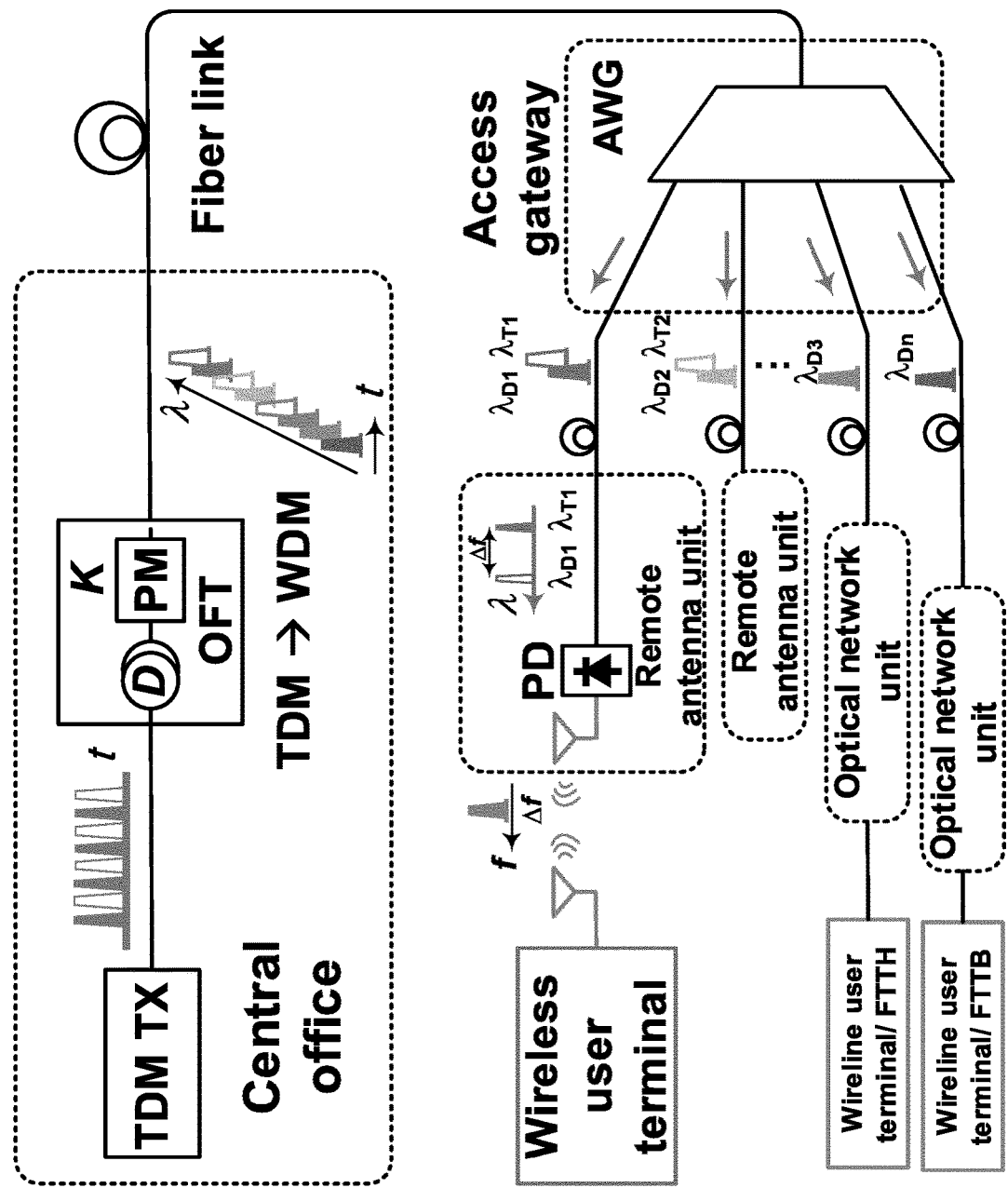
FIG. 4 illustrates the principle of the proposed flexible hybrid photonic-millimeter-wave transmitter.

A time-lens signal processing unit typically comprises a dispersive medium and a phase modulation stage, e.g. two phase modulation stages with an intermediate dispersion medium, a so called K-D-K configuration. Another example is a dispersion medium and a single phase modulation stage, a so called D-K or K-D configuration. A time-lens signal processing stage is an example of an optical Fourier transformation (OFT). A K-D-K configuration has for example been disclosed in WO 2015/131908. However, the K-D-K configuration cannot be directly applied when employing a time lens in a PON system as herein described. Instead, particular operating parameters and conditions must typically be introduced when employing a time lens in a PON system.

Time-Lens Principle

Just as a spatial optical imaging system can produce an image that is larger or smaller than the optical object, a time lens can be used to compress or expand an optical pulse. And as previously disclosed a time lens can expand and compress optical pulses while substantially retaining the temporal profile of the pulse. A time-lens was disclosed in U.S. Pat. No. 5,453,871 where a pulse compressor was presented that operated on a temporal pulse in a manner analogous to the operation of an optical imaging system.

The phase-modulation in the presently disclosed OFT (time-lens) module can be implemented by various means, for example by four-wave mixing (FWM), e.g. using chirped pump pulses. Four-wave mixing (FWM) can be obtained in a nonlinear optical element, wherein the nonlinear optical element is optically pumped with chirped pump pulses. The nonlinear optical element may for example be a highly nonlinear fiber (HNLF). Phase-modulation can also be obtained by cross-phase modulation (XPM) using parabolic intensity profile pump pulses, or electro-optic phase-modulation using an electrical driving signal. The FWM & XPM effects typically originate from the nonlinear optical Kerr effect, which is commonly used for nonlinear optical signal processing. The dispersion medium in the OFT units can be implemented by a standard fibre, such as a standard single mode fiber (SSMF) or a dispersion-compensation fibre (DCF), or a highly nonlinear fiber, or any other dispersive structure, such as Silicon-on-insulator waveguide platform. One example of the latter is an AlGaAs-on-insulator waveguide, for example a thin $Al_xGa_{1-x}As$ layer on top of a low index insulator layer residing on a semiconductor substrate. Wafer bonding and substrate removal can be used to realize the structure. The aluminium fraction (x) can for example be 17%, which makes the material bandgap 1.63 eV and the refractive index 3.33. Thanks to the large index contrast (~55%) of this layout, light can be confined in a sub-micron waveguide core. As the nonlinear parameter ($\gamma$) is highly dependent on the waveguide effective mode area ($A_{eff}$) as expressed by $\gamma=2\pi n_2/\lambda A_{EFF}$, an ultra-high effective nonlinearity of about 660 $W^{-1}$ $m^{-1}$, which is orders of magnitude higher than that of a typical $Si_3N_4$ waveguide, can be obtained for an AlGaAs-on-insulator waveguide using a cross-section dimension of 320 nm×630 nm [6,7].

Optical Line Terminal

As disclosed above a first aspect of the present disclosure relates to an optical line terminal for a passive optical network. An optical line terminal will typically comprise at least one transmitter, e.g. for generating a time division multiplexed (TDM) downstream optical data signal. A time lens optical signal processor, i.e. an OFT element, can then be provided and configured to convert the downstream TDM signal to a downstream WDM signal, typically for distribution to a plurality of users. At least one receiver may be provided for receiving and processing an upstream signal from said users. In this case there can be at least two transmitters, at least one transmitter for generating the data signal and at least one transmitter for generating the carrier signal. For example an optical line terminal for a passive optical network, comprising at least a first transmitter for generating a time division multiplexed (TDM) optical carrier signal, said first transmitter (i.e. signal generator) comprising a first time lens optical signal processor configured to convert the TDM optical carrier signal to an wavelength division multiplexed (WDM) optical carrier signal for distribution to a plurality of users/ONUs, at least a second transmitter for generating a wavelength division multiplexed (WDM) downstream optical data signal for distribution to said plurality of users/ONUs, and at least one receiver for receiving and processing an upstream signal from said users.

A coupling element can be provided for coupling the WDM optical carrier signal and the downstream WDM optical data signal into a single optical fiber. One or more optical amplifiers can furthermore be provided for amplifying the WDM optical carrier signal and/or the downstream WDM optical data signal.

In a further embodiment a third upstream time lens optical signal processor can be provided and configured to convert an upstream WDM signal received from said users to an upstream TDM signal. At least one TDM receiver can then be provided for demultiplexing and processing the upstream TDM signal. Alternatively at least one WDM receiver can be provided for demultiplexing an upstream WDM signal received from said users.

An optical splitter, such as a WDM coupler, can be provided for separating an upstream signal from said users/ONUs from the downstream WDM signal. At least one amplifier, e.g. an optical amplifier, such as an EDFA, can be provided for amplifying the downstream WDM data signal, WDM carrier signal and/or the upstream WDM signal. The downstream amplifier can be seen as a booster amplifier that boosts the WDM downstream signal before entering the transmission link. Likewise with the upstream signal that can be boosted after the transmission link and before the upstream time lens module that converts the WDM signal to a TDM signal.

The wavelength division multiplexed (WDM) optical carrier signal may define a first range of optical wavelengths and the downstream WDM data signal may define a second range of wavelengths. The first and second ranges of wavelengths may be separated by at least 50 nm, more preferably at least 100 nm, most preferably at least 200 nm. For example the first range of wavelengths can be centred around approx. 1300 nm, and the second range of wavelengths can be centred around approx. 1550 nm. A large wavelength separation between the data signals and the carrier signals makes it easy to separate them at the ONU side of a PON system.

The first transmitter of the OLT may be configured for generating an optical carrier signal for at least one or each of the optical data signals, thereby generating pairs of optical carrier signals and optical data signals, i.e. each pair of signals comprises a data signal and a corresponding carrier signal. The time-lens processing can be controlled and configured such each pair of signals has a predefined frequency difference between the signals of the pair. This frequency difference may be selected to correspond to a RF frequency for wireless communication. Hence, by means of for example a photo-detector in the ONUs this frequency difference of each pair can be used to directly generate specific wireless signals for wireless transmission. And remember that the optical data signal of each pair comprises the data information to be wirelessly transmitted and the frequency difference to the carrier signal determines the RF frequency. And all this can be controlled in the OLT for all ONUs by means of the time-lens signal processing.

The WDM optical data signal generated in OLT can also be generated by means of the time-lens principle, as also described in pending application PCT/EP2018/073867 The at least one second transmitter in the OLT may hence be configured for generating a time division multiplexed (TDM) optical data signal, the second transmitter comprising a second time lens optical signal processor configured to convert the TDM optical data signal to said WDM downstream optical data signal.

As stated above the OLT may include a receiver, and this receiver may comprise a third upstream time lens optical signal processor configured to convert an upstream WDM data signal received from said users to an upstream TDM data signal, and at least one TDM receiver for demultiplexing and processing the upstream TDM data signal.

Figure 6:
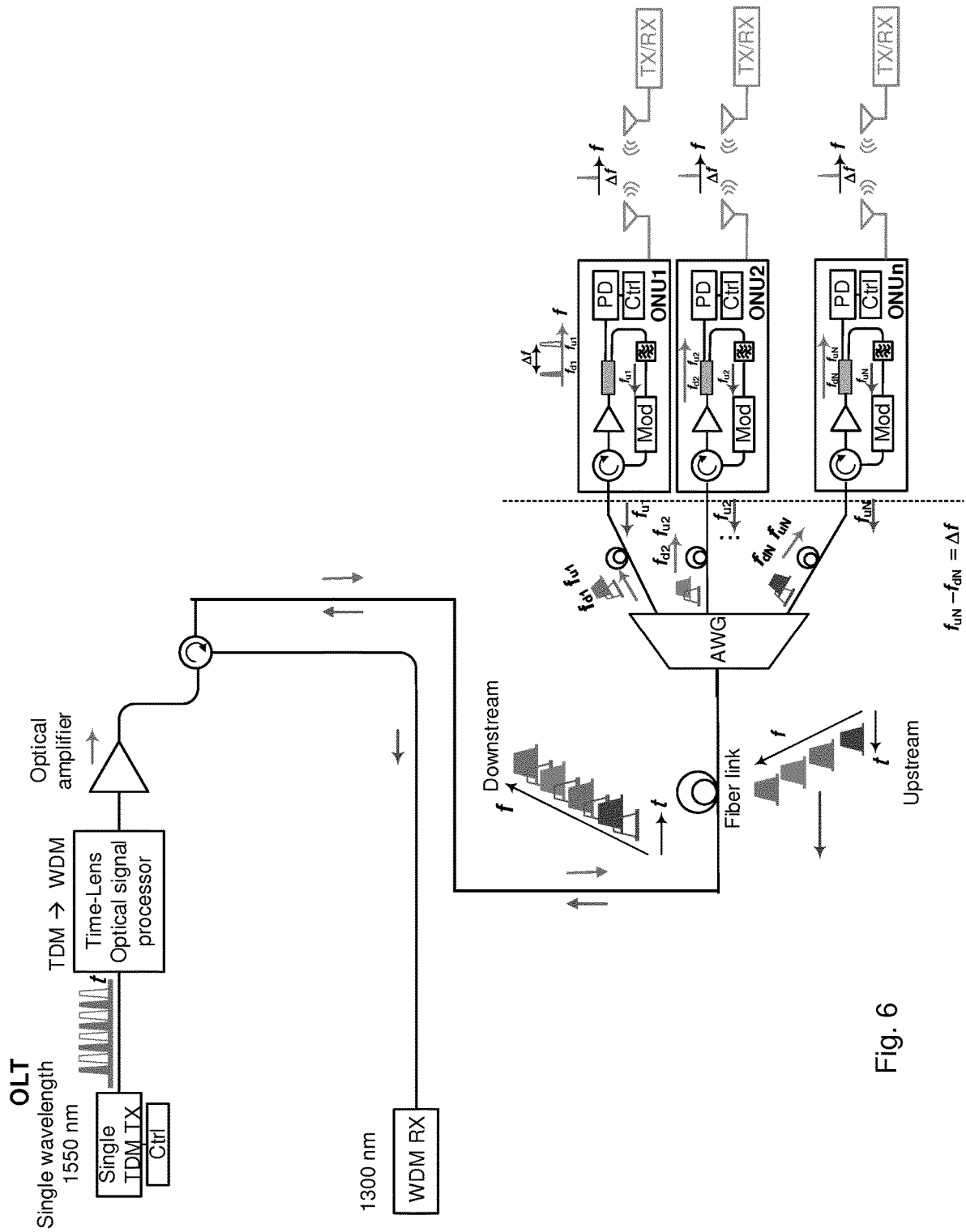
FIG. 6 illustrates an example of WDM PON architecture using time-lens for wireless communication with only one time-lens processor.

Please note that the WDM optical carrier signal and the WDM optical data signal can be generated by the same time-lens based optical processor, as exemplified in FIG. 6 for the wireless case. I.e. the first and second transmitters and/or the first and second time-lens optical signal processors can be the same unit. In such case with only one time-lens signal processor, a TDM data signal must typically be generated with every second TDM tributary carrier before the time-lens optical signal processor, which will then generate the same WDM data channel and WDM carrier pairs. The frequency difference between each data channel and the carrier channel is $\Delta f = \Delta t \cdot K/2\pi$, where $\Delta t$ is the temporal spacing between the data TDM tributary and the adjacent TDM tributary.

In one embodiment of the present disclosure the time lens optical signal processors comprises two phase modulation stages, preferably quadratic phase modulation stages, separated by a dispersive medium in a K-D-K configuration. Preferably $\delta\phi = K_1 t^2/2$ in the first phase modulation stage with linear chirp rate $K_1$, $\delta\phi = K_2 t^2/2$ in second phase modulation stage with linear chirp rate $K_2$, and $D = \beta_2 L$ in the dispersion medium where $\beta_2$ is the $2^{nd}$ order dispersion and L is the length, such that $K_1 = K_2 = 1/D$. The chirp rate K preferably determines the scaling factor between the time and frequency domains according to $\Delta t = 2\pi\Delta f/K$.

In another embodiment of the present disclosure the first and/or second time lens optical signal processor comprises a dispersive medium with dispersion $D = \beta_2 L$ followed by a phase modulation element, preferably a quadratic phase modulation element, with chirp rate $K = 1/D$. The third upstream time lens optical signal processor advantageously then comprises a phase modulation element, preferably a quadratic phase modulation element, with chirp rate $K = 1/D$ followed by a dispersive medium with dispersion $D = \beta_2 L$. I.e. a D-K configuration for the TDM to WDM conversion and preferably K-D configuration for the WDM to TDM conversion. Such configurations can simplify the time lens module, e.g. compared to the K-D-K configuration. The downside can be a small penalty on the capacity of the system.

The time-lens optical signal processor can be simplified from a K-D-K to a D-K configuration for TDM to WDM downstream conversion as exemplified in FIG. 9A in PCT/EP2018/073867. In case of a D-K downstream configuration it may be necessary to add a sufficient amount of guard interval (GI) in the time domain. The amount of guard interval is related to signal bandwidth LA dispersion D, and the gap between the PM windows $T_g$, according to $$GI \geq \frac{2\pi c}{\lambda^2} D\Delta\lambda + T_g$$

where c is the speed of the light, A is the signal wavelength. In the C-band from about 1530 to about 1565 nm this formula can be written as $$GI \approx 0.78 D\Delta\lambda + T_g,$$

I.e. when a sufficient guard interval is provided to the signal periodically following the repetition frequency of the quadratic phase-modulation $f_{PM}$, the first quadratic phase-modulation stage can be omitted. However, adding a guard interval naturally reduces the data capacity of the system. I.e. it becomes a balance between cost and data capacity.

Upstream for WDM to TDM conversion the K-D-K configuration can also be simplified, in this case to a K-D configuration as exemplified in FIG. 9B of PCT/EP2018/073867. In contrast to the guard interval for the downstream D-K configuration there are no limitations for the upstream K-D configuration and again $K_1$ can be omitted.

The dispersive medium can be a length of optical fiber, such as transmission fiber, such as a standard single mode fiber (SSMF), such as a dispersion compensating fibre (DCF), such as a highly nonlinear fiber. The phase modulation stage(s) may comprise(s) a length of highly non-linear fiber. In general the phase modulation can for example be based on four-wave mixing (FWM), e.g. using chirped pump pulses, cross-phase modulation (XPM) e.g. using parabolic intensity profile pump pulses, or electro-optic phase-modulation e.g. using an electrical driving signal.

A clock recovery unit may be provided and configured to synchronize the third upstream time-lens signal processor to the upstream WDM signal. Further, the single channels of the upstream WDM signal may advantageously be symbol-wise synchronized at the input of the second time-lens optical signal processor. At least one control unit may be provided and connected to the transmitter and/or the receiver and configured to control the wavelength and timing of the signals.

Symmetric Few Point to Multi-Point

The capacity of a point to multi-point architecture can be further increased by a so-called symmetric few point to multipoint architecture. The main difference from the symmetric point to multipoint time-lens PON architecture disclosed above is that a single wavelength TDM transmitter and receiver in the OLT is replaced by multi-wavelength TWDM transmitter array and receiver array having a multiple M of wavelengths. However, the number M of wavelengths is typically much less than the ONU counts N. This few point to multipoint architecture can increase the total time-lens PON capacity by a factor M, by simply adding TDM TRX at different wavelengths in the OLT. At the ONU side, the individual ONU obtains increased bit rate at the original wavelength, without the requirement of a WDM TRX array.

Hence, in the few point to multipoint architecture the downstream WDM signal may comprise N signal wavelengths and the transmitter may then comprise a multi-wavelength time and wavelength division multiplexed (TWDM) array configured to generate a time division multiplexed downstream optical signal at M different wavelengths, and where M is (much) less than the number N of signal wavelengths in the downstream WDM signal. Correspondingly the receiver may comprise a multi-wavelength time and wavelength division multiplexed (TWDM) array configured to receive and process a time division multiplexed upstream optical signal at M different wavelengths.
Asymmetric Point to Multi-Point and Few Point to Multi-point Some access networks require larger capacity for the downstream transmission than for the upstream transmission. In that case an asymmetric PON architecture in which the total upstream data rate is less than the downstream data rate can be suitable. This embodiment combines the time-lens PON and traditional TDM PON, where the time-lens PON architecture is used for the high capacity demand of the downstream transmission, while the traditional TDM PON is used for the less demanding upstream transmission. The downstream part can be similar to the symmetric point to multipoint and few point to multipoint as described above.

In the asymmetric (few) point to multipoint architecture the receiver may advantageously be simplified and configured to receive and process a time division multiplexed upstream optical signal at a single wavelength.

Passive Optical Network System

A further aspect of the present disclosure relates to a passive optical network (PON) system comprising the optical line terminal as described herein. A PON system typically comprises an optical fiber infrastructure for distributing the downstream and upstream signals. Typically also at least one remote node for splitting the downstream WDM signal into separate wavelength signals, typically a passive remote node, i.e. without power supply, such as a passive AWG. The at least one remote node can then be configured for combining upstream separate wavelength signals into an upstream WDM signal. The remote node may comprise at least one arrayed waveguide grating (AWG) for splitting the downstream WDM signal into separate wavelength signals and/or for combining the upstream signals into a single WDM or TDM upstream signal.

In the symmetric point to multipoint or few point to multipoint architecture the presently disclosed PON system may further comprise separate ONU transmitters located at each user and configured to generate separate wavelength upstream signals that can be combined to a single (or few) upstream WDM signals.

In the asymmetric point to multipoint or few point to multipoint architecture the presently disclosed PON system may further comprise separate ONU transmitters located at each user configured to generate upstream signals at one predefined wavelength that can be combined to a single (or few) upstream TDM signal(s). In that case each network line between the remote node(s) and the separate ONUs may comprise a splitter, e.g. a WDM coupler, for separating the upstream signal at said predefined wavelength from the downstream separate wavelength signals.

As stated previously one embodiment relates to a passive optical network (PON) system comprising the presently disclosed OLT, optionally an optical fiber infrastructure for distributing the downstream and upstream signals, a plurality of optical network units (ONU), preferably one for each end user, at least one remote node for splitting the downstream WDM optical data signal and the WDM optical carrier signal into separate wavelength signals such that each ONU receives a downstream signal optical data signal at a first specific wavelength and an optical carrier signal at a second specific wavelength. Each ONU may be colourless.

Each ONU may comprise a coupling element for separating the optical carrier signal and the downstream optical data signal, a receiver for receiving and processing the downstream optical data signal and an upstream signal generator for receiving and modulating the optical carrier signal, thereby generating an upstream optical data signal. The upstream signal generator may comprise a reflective semiconductor optical amplifier and/or an optical circulator, amplifier and modulator for receiving, amplifying and modulating the optical carrier signal.

A further embodiment relates to a passive optical network (PON) system comprising the presently disclosed OLT, optionally an optical fiber infrastructure for distributing the downstream and upstream signals, a plurality of optical network units (ONU), preferably one for each end user, at least one remote node for splitting the downstream WDM optical data signal and the WDM optical carrier signal into separate wavelength signals such that each ONU receives a downstream optical data signal at a first specific wavelength and an optical carrier signal at a second specific wavelength, wherein said ONU's are configured for generating a radio frequency (RF) data signal for wireless communication based on the frequency difference between the first and second wavelengths. A part of each optical carrier signal may be used for generating said RF data signal and another part of said optical carrier signal is used for generation of an upstream optical data signal.

Example of Optical Line Terminal Including Upstream Data Carrier Referring to FIG. 3, in downstream data transmission, the data signals are transmitted from OLT (101) to N ONUs (102,103,104). A WDM transmitter (105) at 1550 nm generates a N channel WDM signal ($\lambda_1, \lambda_2 \ldots \lambda_n$). The generated WDM signal is amplified in the optical amplifier (106), and then send into a WDM coupler (107), which is used for separating the downstream and upstream signals in the OLT. A single strand fiber (108) is used for transmitting the WDM signal from the OLT to the remote node (RN) location, which is close to the ONUs. At the RN location, a passive periodic arrayed waveguide grating (AWG) (109) with wavelength channel spacing equals to $\Delta v$ is used for splitting a pair of a WDM signal and a WDM carrier to each ONU.

For the upstream transmission, to avoid the use of wavelength tunable/specific lasers at each ONU, N WDN carriers are generated in the OLT with the same channel spacing $\Delta v$ at 1300 nm using a time lens signal processor, which is subsequently sent to individual ONUs as a data carrier. A pulse generator (111) generates an optical pulse train (201) at 1300 nm with repetition rate $f_s$. The pulse train is converted to N WDM carriers (202) with wavelength spacing $\Delta v$ using a time-lens based optical processor (112). The converted WDM carriers are amplified in an optical amplifier (113), and send into a circulator follow by a WDM coupler, which are used for separating the downstream and upstream signals in the OLT. A single standard fiber (108) is used for transmitting the WDM signal at 1550 nm and the generated WDM carriers at 1300 nm from the OLT to the remote node (RN) location, which is close to the ONUs. At the RN location, a passive periodic arrayed waveguide grating (AWG) (110) with wavelength channel spacing equal to $\Delta v$ is used for splitting the WDM signal and the WDM carrier to each ONU. Each ONU receives a WDM signal channel around 1550 nm and an WDM carrier channel around 1300 nm. Control units (115) are used to control the wavelength and timing of the pulse generator.

Figure 7:
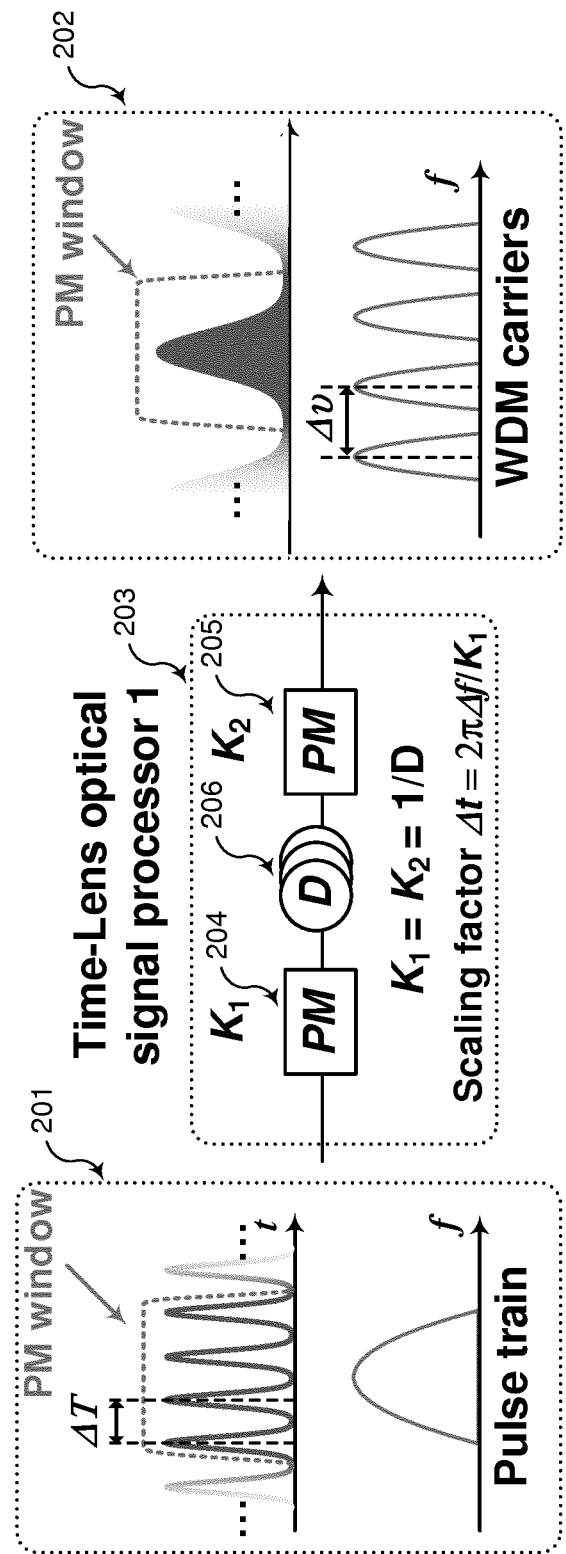
FIG. 7 exemplifies the presently disclosed principle of conversion from pulse train to WDM carriers FIG. 8A exemplifies the presently disclosed principle of conversion between from multi-wavelength pulse train to symbol rate enhanced WDM carriers.

FIG. 7 illustrates the conversion of the optical pulse train (201) to N WDM carriers (202) using a time-lens signal processor (203). Here, ΔT is the pulse temporal spacing, and Δv is the wavelength spacing of the converted WDM carriers. The time lens optical signal processor comprises two quadratic phase-modulation (PM) ($\delta\phi=Kt^2/2$) stages (204, 205) with linear chirp rate K, separated by a dispersion medium (206) of $D=\beta_2 L$ (where $\beta_2$ is 2nd order dispersion and L is the length), which satisfy the condition $K_1=K_2=1/D$ (a K-D-K configuration). The chirp rate K determines the scaling factor between the time and frequency domains according to $\Delta t=2\pi\Delta f/K$. After the processor, the pulse train is converted to N WDM carriers with channel spacing Δv depending on the choice of K. The repetition frequency of the quadratic phase-modulation $f_{PM}$ is set equal to $f_s/N$. The phase-modulation window is given by $T_{PM}=1/f_{PM}$.

In the upstream data transmission, as the WDM carriers are generated at the OLT, there are no need to use wavelength tunable/specific components at ONU sides, aka the ONUs are colorless. FIGS. 3B and 3C show two typical colorless ONU structures. In both ONU structures, the transmitted WDM signal at $\lambda_{dN}$ (around 1550 nm) and the WDM carrier at $\lambda_{uN}$ (around 1300 nm) are separated by a WDM coupler. The WDM signal is received by an optical receiver (301,303). For upstream transmission, a reflective semiconductor optical amplifier (RSOA) is used in FIG. 3B to amplify and modulate the WDM carrier. This can also be realized by a combination of optical circulator (304), optical amplifier (305) and modulator (306) as shown in in FIG. 3C. The individual WDM channels are combined to an N-wavelength WDM signal at the AWG, and transmitted back to the OLT through the same optical fiber at a different wavelength region (1300 nm). In the OLT, the upstream WDM signal is switched to the upstream WDM receiver by the WDM coupler.

Figure 5:
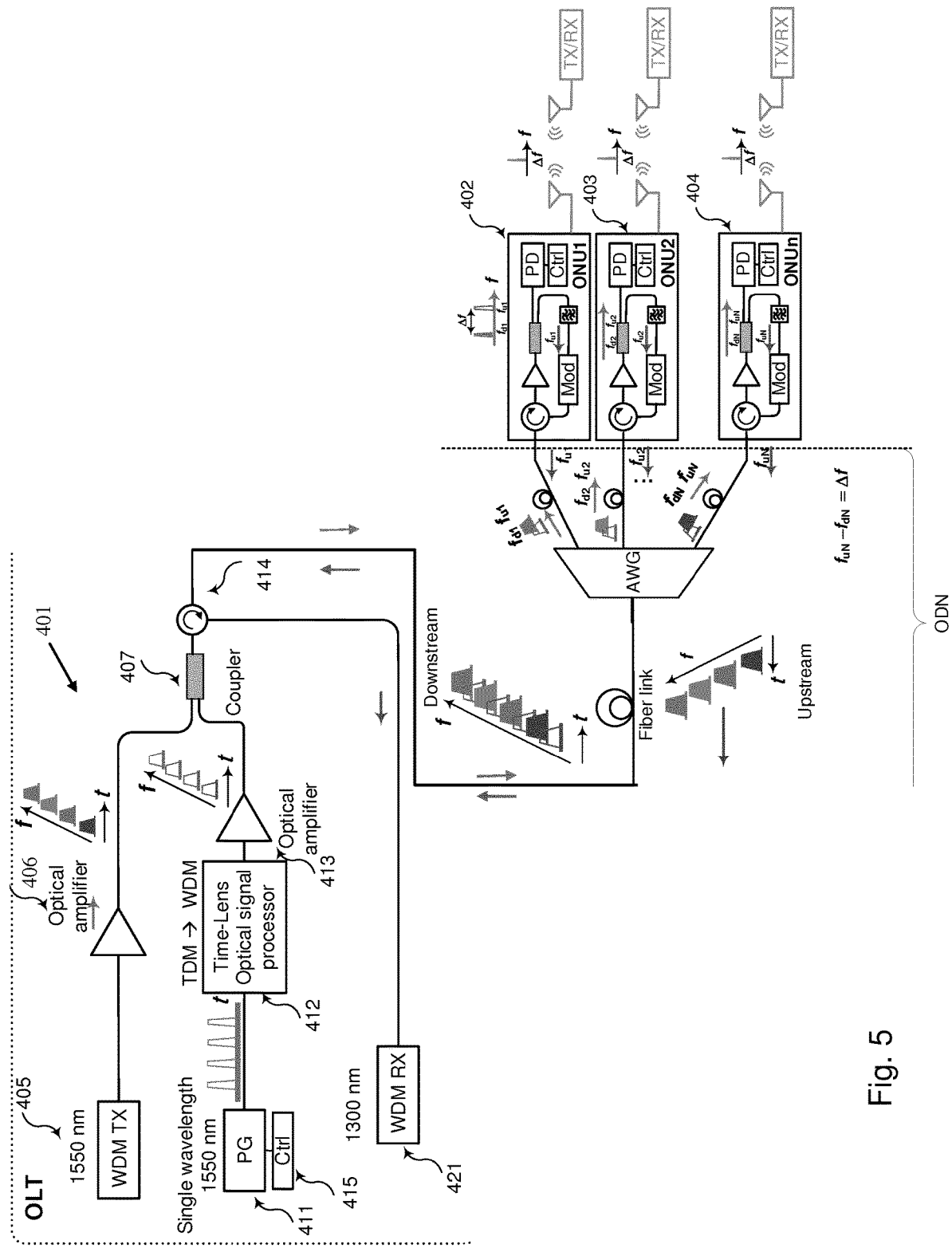
FIG. 5 illustrates an example of WDM PON architecture using time-lens for wireless communication.

Example optical line terminal for generation of WDM-ROF/WDM Channels A coherent WDM PON architecture using time-lens for wireless communication is presented herein. The basic idea is to generate the same number of WDM carriers next to the WDM data channels and transmit them through WDM PON. At each ONU, the WDM data channel is converted to radio frequency (RF) by sending the WDM data channel to a photodetector together with an WDM carrier. The WDM carriers typically have to be generated at the same wavelength range as the WDM data channels. As shown in FIG. 5, a WDM transmitter (405) at 1550 nm generates a N channel WDM signal ($\lambda_1, \lambda_2 \ldots \lambda_n$) with spacing Δv. A pulse generator (411) generates an optical pulse train at the same wavelength. The pulse train is converted to N WDM carriers with wavelength spacing Δv using a time-lens based optical processor (412). The converted WDM carriers are amplified in an optical amplifier (113), and send into a coupler followed by a circulator, which are used for separating the downstream and upstream signals in the OLT. The frequency difference between the WDM data channel $f_{dN}$, and with wavelength channel spacing equal to Δv is used for splitting a pair of a WDM signal and a WDM carrier to each ONU (402, 403, 404).

In each ONU, after amplification, half of the pair of the WDM signal and the WDM carrier is sent to the photodetector for RF signal conversion, which is then send to the antenna for wireless transmission. The WDM carrier in the other half is extracted by an optical bandpass filter and data modulated by a modulator. The modulated WDM channel is send back to the OLT through the circulators and the AWG. The carrier frequency of the RF data signal can be modified by changing the frequency difference Δf between the WDM data channel and the WDM carrier, this can be controlled by the time lens optical signal processor and the pulse generator in the OLT.

Furthermore, as stated previously a pair of data channel and carrier channel can also be received directly by a commercial coherent receiver without the usual need of an additional local oscillator. This will typically require that the frequency difference between the WDM data channel and the WDM carrier is within the bandwidth limit of the coherent receiver.

Figure 8A:
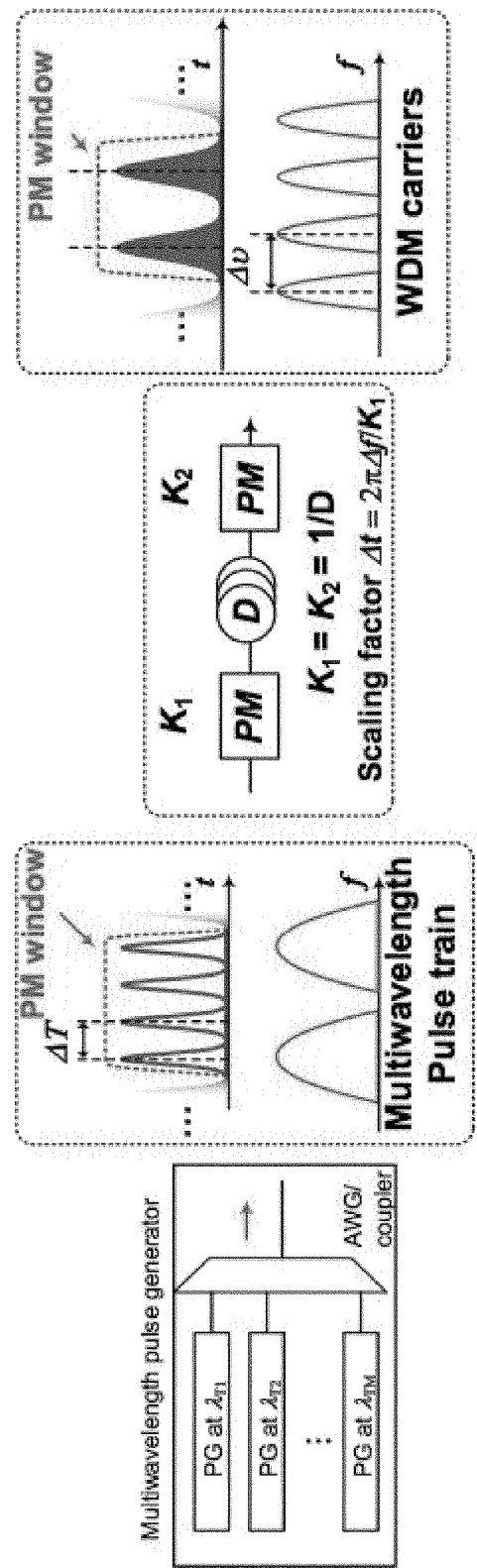
FIG. 8B illustrates the principle of conversion that can be applied in the conversion from a multi-wavelength TDM signal to symbol rate enhanced WDM data channels and WDM carriers.

The symbol rate of the generated WDM carriers can be increased by adding more pulse generators at different wavelengths as shown in FIG. 8A.

Figure 8B:
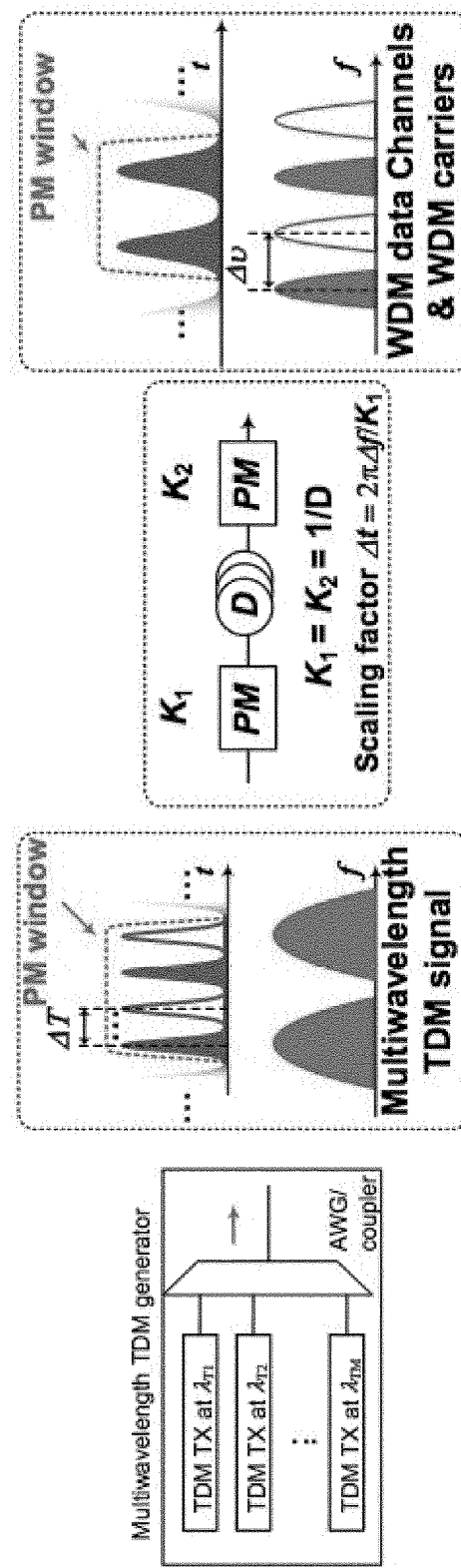

Similarly, when using only one time-lens based optical processor to generate both the WDM data channels and the WDM carriers, the symbol rate of the generated WDM data channels and the WDM carriers can also be increased by adding more TDM generators at different wavelength as shown in FIG. 8B, i.e. the assymetric few point to multipoint scheme.

Figure 9:
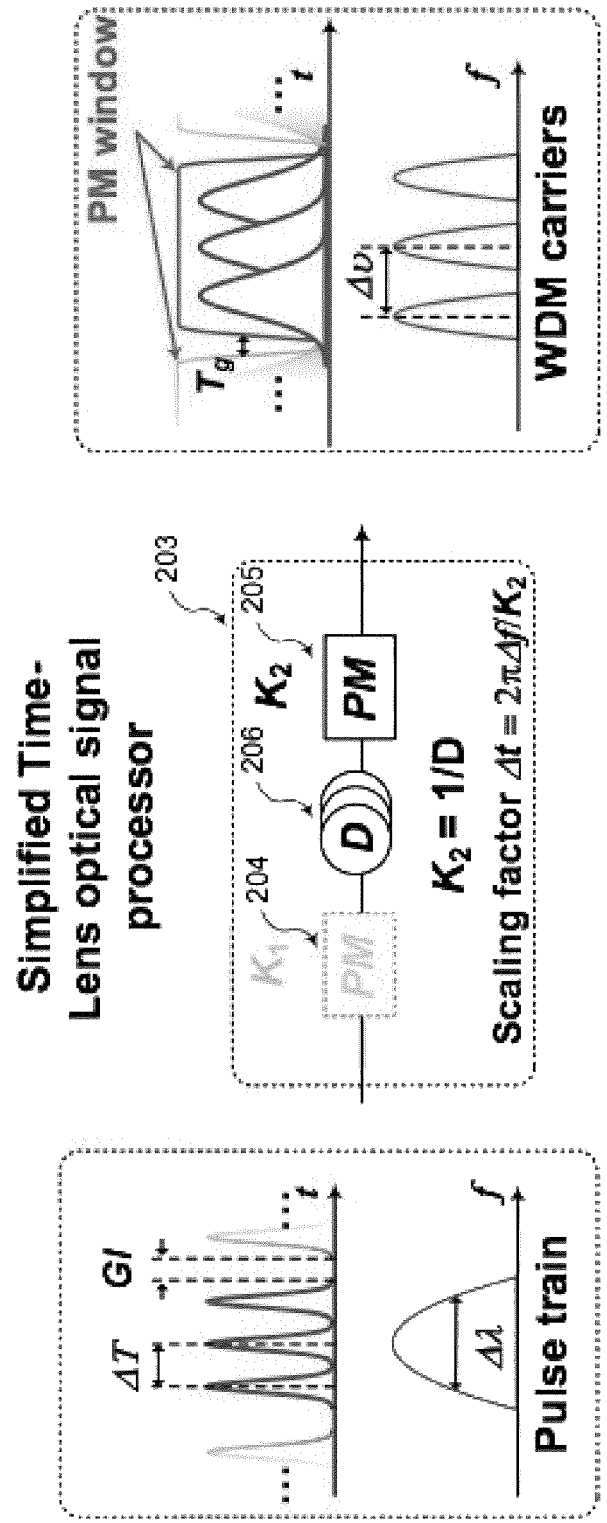
FIG. 9 shows one example of the presently disclosed principle of conversion using a simplified time-Lens optical signal processor in a D-K configuration.

As shown in FIG. 9 the time-lens optical signal processor for pulse train to WDM carrier conversion can be simplified to a D-K configuration by adding a sufficient amount of Guard Interval (GI) in time domain. The amount of GI is related to signal bandwidth Δλ, dispersion D, and the gap between the PM windows $T_g$, according to $$GI \geq \frac{2\pi c}{\lambda^2} D\Delta\lambda + T_g$$

Where c is the speed of the light, λ is the signal wavelength. In the C-band this equation can be written as $$GI \approx 0.78 D\Delta\lambda + T_g$$

When the sufficient GI is inserted to the signal periodically follow the repetition frequency of the quadratic phase-modulation $f_{PM}$, the first quadratic phase-modulation stage can be omit as shown in FIG. 9.

Advantages of Time-Lens PON

FIG. 1 shows four examples a)-d) of prior art optical access systems where c) and d) show PON systems. FIG. 1(a) is point to point system that requires a large number of optical fibers and transmitters. FIG. 1(b) shows an active optical network that requires a large number of transmitters. FIG. 1(c) is an example of a TDM-PON system that is a cost-efficient solution because only a single transmitter is required in the central office (CO). The TDM-PON principle is illustrated in further detail in FIG. 2A. The WDM-PON system illustrated in FIG. 1(d) is a point to point system with many technical advantages but this is not a cost-efficient solution. The WDM-PON principle is illustrated in further detail in FIG. 2B. Compared to these prior art solutions there are a number of advantages of time-lens PON:

Single (or few) transmitter(s) in central office (CO): Less cost and energy consumption, i.e. one of the advantages of existing TDM PON is maintained in time-lens PON.

Splitting loss is small and independent of the number of subscribers: In a conventional PON system, the use of passive optical splitter/combiner introduces a ~10 Log N [dB] splitting loss depending on the subscriber count N, which severely limits the user counts. In contrast to this, in the time-lens PON the optical splitter can be replaced, for example by a conventional passive AWG, with a much lower fixed loss (<4 dB) regardless of the number of subscribers. This allows for efficient scale up of the amount of users.

Figure 13:
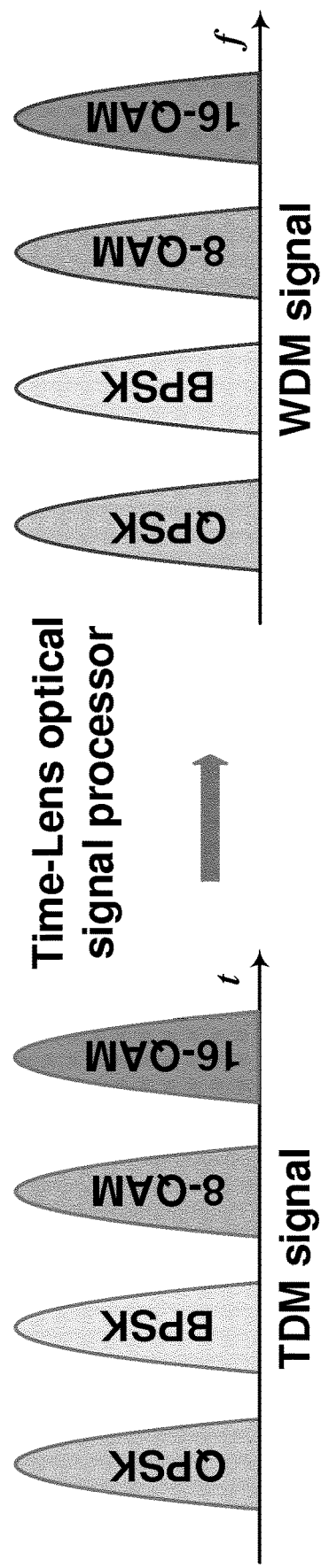
FIG. 13 illustrates that time-lens signal processing allows different modulation formats to be used on different WDM channels, and also allows dynamic adjustment for different requirements.

Additional flexibility: Time-lens PON allows dynamic assignment of connections to different RAUs for wireless users, and also to different WDM optical network units for wired users, without tuning the emission wavelengths of the optical sources but by simply changing the structure of the electrical TDM signal. Furthermore, it also allows different modulation formats to be used on different WDM channels, and dynamic adjustment for different needs as shown in FIG. 13.

No subscriber count N dependent SNR penalty: In a conventional PON system the OLT broadcasts the TDM signal to all ONUs. The actual signal power is therefore only 1/N of the total received power at each ONU. The larger integrated noise bandwidth also brings noise. This results in a SNR penalty proportional to $N^2 \sim N^3$. In contrast hereto each ONU only receives its own signal at the base bandwidth in time-lens PON.

Hence, there is no subscriber count dependent SNR penalty in time-lens PON, resulting in much better receiver sensitivity, e.g. ~10 dB better than that of prior art TDM-PON with 32 users.

Better power budget: The reduced splitting loss and better receiver sensitivity result in a larger power budget of time-lens PON compared to prior art PON. The enhanced power budget is furthermore independent of the subscriber count. The enhanced power budget can be used to scale up the total capacity, user count and transmission reach efficiently.

No extra bandwidth requirement on the components at the ONU side: In a conventional PON system, the transceivers at the ONU side require a bandwidth which is tens of times of the actual used data rate. Upgrade of such a system requires a large amount of optoelectronic devices with even higher bandwidth for all ONUs—this is costly and results in higher energy consumption. In the presently disclosed time-lens PON, there is no extra bandwidth requirement, allowing re-use of the existing devices on the ONU side for tens of times more data capacity, which is more cost- and energy-efficient than the other prior art high capacity PON solutions.

No security issues: Prior art PON systems require data encryption, since each ONU has access to all the data sent to any of the other users on the PON. In the presently disclosed time-lens PON, a wavelength demultiplexer (e.g. an AWG) at the RN directs a different wavelength to each user. Thus, there are no security issues since users on the time-lens PON do not have access to any of the other downstream wavelengths. Hence, security is guaranteed by the architecture of the physical network.

Dispersion tolerance: Conventional PON systems transmit high speed TDM signal in the fiber link, which has poor dispersion tolerance—and the dispersion tolerance will become worse and worse when the speed of the TDM signal increases. The presently disclosed time-lens PON transmits low speed WDM signals in the fiber link, which has better dispersion tolerance than prior art PON systems.

No Quality of Service (QoS) issues related to sharing the PON: When bandwidth demand becomes high in prior art PON systems it can lead to QoS issues, e.g. how to fairly assign capacity to multiple high-demand users. This may lead to a requirement of larger buffer memories for users waiting to send data and issues regarding time delays and packet loss. In the presently disclosed time-lens PON, there is no issue regarding QoS or privacy, since no optical signals are shared with anyone else connected to the time-lens PON. Even at the internet rush hour, the user experience is guaranteed.

The advantages listed above can be summarized as follows:

| Feature | Prior art PON | Time-lens PON |
|---|---|---|
| TRX count in CO | 1 | 1 (or few) |
| Splitting loss | 10logN [dB] | <5 dB |
| SNR Penalty | $N^2 \sim N^3$ | Reference |
| Receiver sensitivity for 32 users | ~−10 dB | Reference |
| Security | No | Yes |
| Bandwidth at ONU | N × subscriber data rate | Subscriber data rate |
| Power budget | Small | Large |
| Dispersion tolerance | Bad | Good |
| QoS | Priority management | No issue |

Example

In this example a flexible hybrid photonic-millimeter-wave transmitter is realized based on a time-lens optical signal processor. 12×2.5-Gb/s OOK and 10×4-Gb/s QPSK hybrid transmission over 100-km SSMF and 0.5-m wireless distance have been demonstrated. A record for the highest number of WDM-ROF channels generated from a single laser and modulator has been achieved, showing great potential for future wireline/wireless integrated access networks.

The principle of the proposed flexible hybrid photonic-millimeter-wave transmitter is shown in FIG. 4. In the central office, a single-carrier TDM transmitter generates a high-speed TDM signal, in which each TDM data tributary will be later converted to a separate wavelength. For ROF channels the adjacent tributary is left unmodulated.

OFT is performed to transform this TDM signal to a number of WDM channels at the rate of the relevant TDM tributary; the tributaries act as up-conversion tones. After fiber transmission, an arrayed waveguide grating (AWG) at the access gateway is used to extract a pair of WDM data channel $\lambda_D$ and optical tone $\lambda_T$ to the specific remote antenna unit (RAU). In each RAU, heterodyne up-conversion is performed in a fast photodiode (PD). The RF signal is then fed to an antenna for wireless transmission. The proposed scheme allows a single TDM time-lens source to generate several WDM data channels for wired and wireless access-networks simultaneously.

Additional flexibility is provided by the OFT in terms of channel switching and wavelength allocation. It allows dynamic assignment of connections to different RAUs for wireless users, and also to different WDM optical network units for wired users, without tuning the emission wavelengths of the optical sources but by simply changing the structure of the electrical TDM signal. This is the only single-modulator transmitter structure where such extreme level of flexibility can be achieved without optical tuning.

Figure 10:
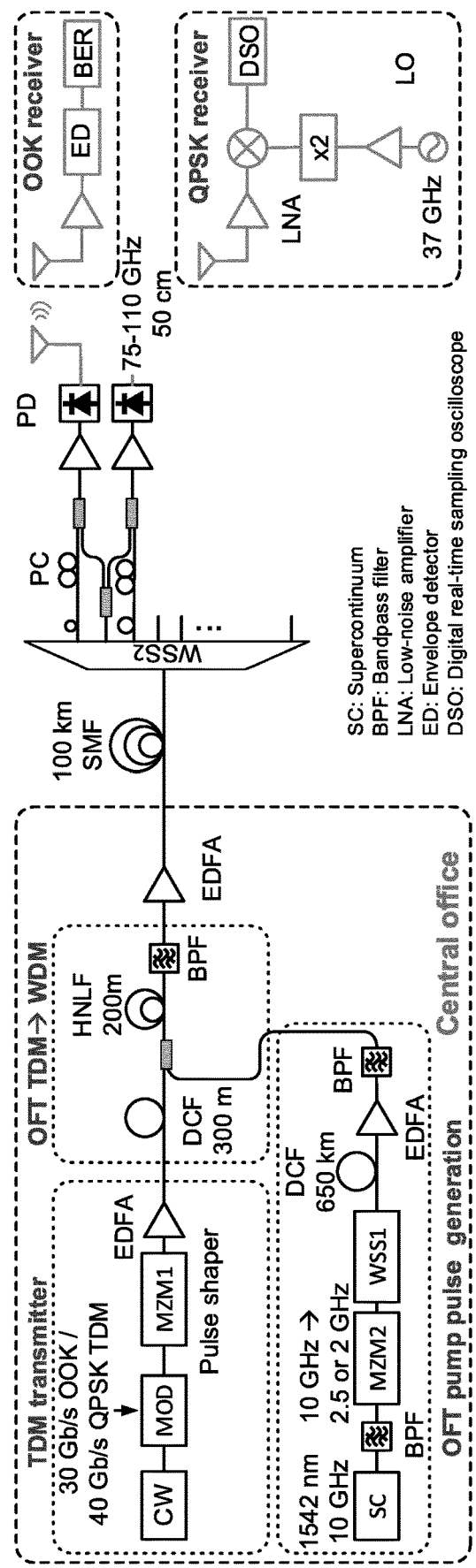
FIG. 10 illustrates the setup of 12×2.5-Gb/s OOK and 10×4-Gb/s QPSK transmission over 100-km SSMF plus 0.5 m wireless distance.

The experimental setup is shown in FIG. 10. Starting with the OOK transmission, the output of a CW laser at 1577 nm is NRZ on-off keying (OOK) modulated in a Mach-Zehnder modulator (MZM). The data pattern used for OOK modulation is generated from a 50 Gbps bit pattern generator, and consists of 12×2.5-Gb/s OOK TDM tributaries and 6 unmodulated ones, forming every third data tributary. 40-ps guard interval (GI) is inserted between every 18 TDM tributaries for OFT operation. A second MZM is used to carve the NRZ signal into RZ pulses. The obtained TDM signal waveforms are shown in FIG. 11A, and are directly converted to individual 80-GHz spaced WDM channels using the OFT. At the OFT, the obtained TDM signal is initially dispersed in a 300 m dispersion compensation fiber (DCF) with dispersion of −100 ps/nm/km. The subsequent quadratic phase modulation stage is based on a four-wave mixing (FWM) process in a highly nonlinear fiber (HNLF) using linearly-chirped rectangular pump pulses. In this lab demonstration, the pump pulses are generated by down sampling a 10 GHz mode-locked laser at 1542 nm to 2.5 GHz and broadening its spectrum in 400 m HNLF. A wavelength selective switch (WSS) is used to extract the required spectrum to form the OFT pump which is propagated through 650 m DCF to achieve the correct chirp rate for conversion of 20 ps spaced TDM tributaries to an 80 GHz frequency grid. A practical implementation of the OFT pump source might rely on electro-optic modulation and a variable dispersive element. The resulting spectrum is shown in FIG. 11B. The generated idler is the 12 WDM data channels and 6 pulsed optical tones with 80 GHz spacing converted from the TDM signal. The obtained WDM signal is boosted to 17 dBm using an erbium doped fiber amplifier (EDFA) and launched into a 100 km unamplified SMF fiber link. The launched power was optimized taking fiber nonlinearity into account. The wavelength splitter is implemented by a WSS, which extracts a WDM data channel and a tone to two output ports. An optical delay line is used to temporally align the WDM channel and the optical tone. In this demonstration 2 WDM data channels share a common optical tone in-between them, thus increasing the throughput. The combined optical signal is heterodyned in a 100-GHz bandwidth photodiode generating a W-band wireless signal centred at 80 GHz which is fed to a horn antenna with 24 dBi gain. After 0.5 m wireless transmission, the signal is detected by another horn antenna, and finally received by an envelope detector-based receiver.

Figure 11:
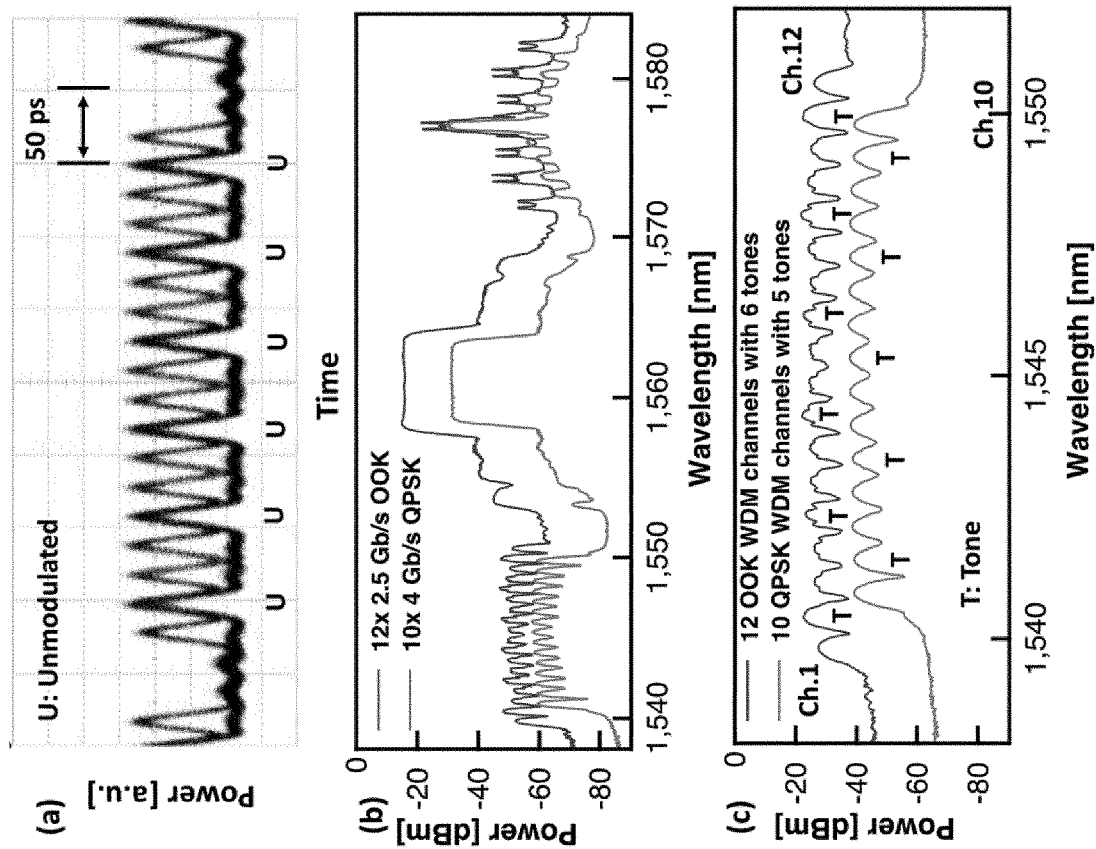
FIG. 11A illustrates the waveform of the 12×2.5 Gb/s TDM OOK signal.
FIG. 11B illustrates the spectrum of the OFT output.
FIG. 11C illustrates the WDM channels obtained with optical tones (marked with T).

To investigate scalability and compatibility with phase encoded signals, QPSK transmission is also demonstrated. 10×4-Gb/s QPSK TDM tributaries and 5 unmodulated ones are generated from a 32 GHz arbitrary waveform generator driving an IQ modulator. OFT pump dispersion is adapted to 1 km DCF to convert 31 ps temporal spacing to an 80 GHz frequency grid. The generated WDM channels are also shown in FIG. 11. At the receiver, down-conversion is realized by a W-band balanced mixer driven by a 74-GHz local oscillator (LO) signal.

Experimental Results

Figure 12B:
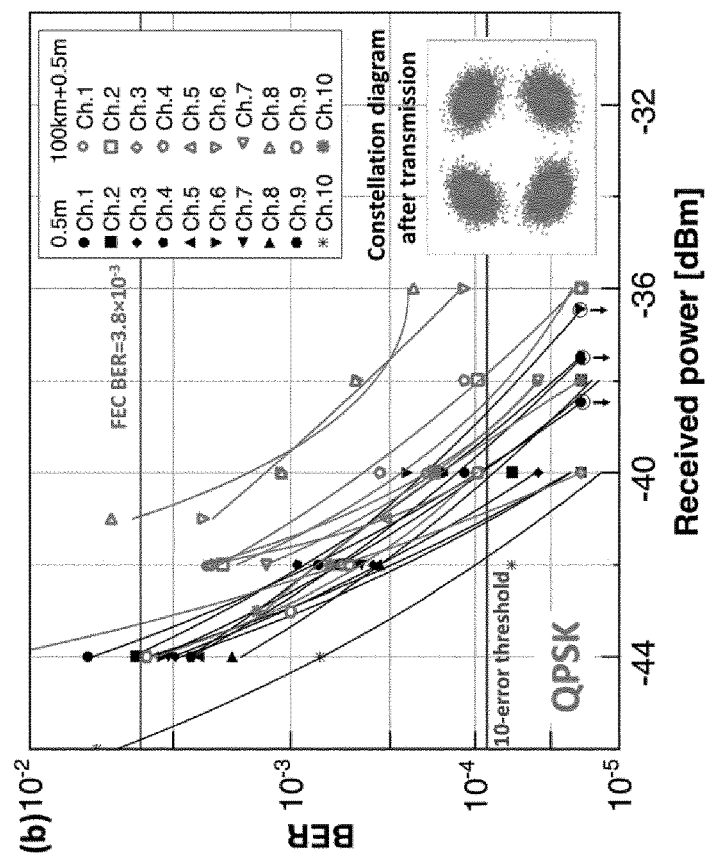
FIG. 12B shows all channel BER performance of 10×4-Gb/s QPSK hybrid transmission.
Figure 12A:
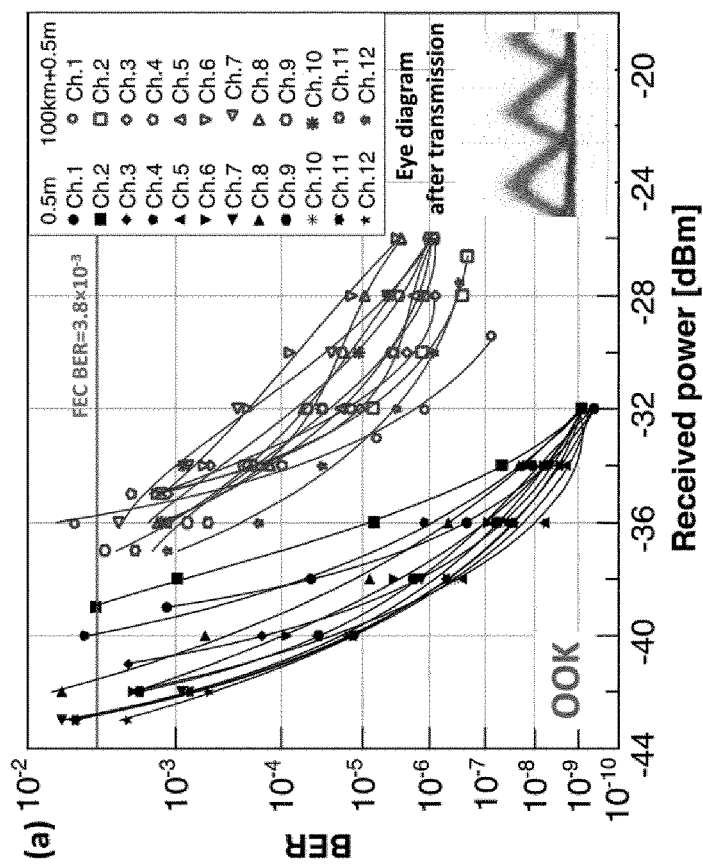
FIG. 12A shows all channel BER performance of 12×2.5-Gb/s OOK hybrid transmission.

FIG. 12A shows the 12×2.5-Gb/s OOK hybrid transmission BER performance versus the received power varied by an optical attenuator at the input of the pre-amplifier before the PD. For reference, the BER performance of all ROF-WDM channels received by the envelope detector without fiber transmission is also shown. BER<$10^{-9}$ is achieved for all generated ROF-WDM channels. The BER after 100-km transmission is show by open symbols in blue colour. The maximum received power after transmission is around −26 dBm. An OOK eye diagram after envelope detection is show in the inset of FIG. 12A. All converted WDM channels achieve BER<$4\times10^{-6}$, confirming a significant margin to the hard-decision forward error-correction (HD-FEC) threshold of BER=$3.8\times10^{-3}$. The average power penalty at BER=$10^{-6}$ after transmission is 8.4 dB, which is due to fiber nonlinearity and dispersion during the fiber transmission. FIG. 12B shows the BER performance of 10×4-Gb/s QPSK hybrid transmission. The performance without fiber transmission is shown in black curves, where BER=$8.4\times10^{-6}$ (10 error threshold) counted from $1.2\times10^5$ received data bits is achieved for all generated QPSK ROF-WDM channels. After 100-km fiber and 0.5 m wireless transmission, all converted WDM channels achieve BER<$3\times10^{-4}$ performance, below the FEC threshold. The average power penalty at BER=$10^{-3}$ after transmission is 1.5 dB. The power penalty of QPSK is much less than that of OOK signal. Compared with the OOK direct detection, better receiver sensitivity is gained by using simple digital signal processing for QPSK transmission. The DSP consists of frequency down conversion, equalization, phase recovery, and BER counting.

REFERENCES

[1] D. Nesset, "PON roadmap [invited]," IEEE J. Opt. Commun. 9 (1), A71, (2017).
[2] V. Houtsma et al., "A Study of Options for High-Speed TDM-PON Beyond 10G," JLT, 35 (4), 1059, (2017).
[3] Y. Luo et al. "Time- and Wavelength-Division Multiplexed Passive Optical Network (TWDM-PON) for Next-Generation PON Stage 2 (NG-PON2)." JLT, 31(4), 587, (2013).
[4] E. Wong, "Next-Generation Broadband Access Networks and Technologies." JLT., 30 (4), 597, (2012).
[5] P. Guan et al., "Time lens based optical Fourier transformation for all-optical signal processing of spectrally-efficient data," JLT, 35 (4), 799, (2017).
[6] M. Pu et al., Optica 3, 823 (2016).
[7] L. Ottaviano et al., Opt. Letters 41, 3996 (2016).
[8] 5G PPP. 5G Vision. Whitepaper. February 2015.
[9] M. Xiao et al., "Millimeter Wave Communications for Future Mobile Networks". IEEE JSAC. 35 (9) 1909 (2017).
[10] P. Guan et al., "Highly Flexible WDM PON System with a Single TDM Time Lens Source Enabling Record 150 km Downstream Reach". OFC2018. Th2A.54, (2018).
[11] P. Guan et al., "128×2 Gb/s WDM PON System with a Single TDM Time Lens Source using an AlGaAs-On-Insulator Waveguide". CLEO2018. SM2C.3, (2018)
[12] M. Nakazawa et al., "Ideal distortion-free transmission using optical Fourier transformation and Fourier transform-limited optical pulses," PTL. 16, 1059, (2004).

The invention claimed is:
1. An optical line terminal for a passive optical network, comprising
   at least a first transmitter at an optical line terminal of a passive optical network, the transmitter configured to generate a time division multiplexed (TDM) downstream optical carrier signal, said first transmitter comprising a first time lens optical signal processor comprising two phase modulation stages with chirp rate K=1/D separated by a dispersive medium with dispersion D=$\beta_2$L in a K-D-K configuration, wherein $\beta_2$ is the $2^{nd}$ order dispersion and L is the length of the dispersive medium, such that the first time lens optical signal processor is configured to convert the TDM downstream optical carrier signal to a wavelength division multiplexed (WDM) downstream optical carrier signal for distribution to a plurality of users/Optical Network Units (ONUs) via passive demultiplexing in the passive optical network,
   at least a second transmitter for generating a wavelength division multiplexed (WDM) downstream optical data signal for distribution to said plurality of users/ONUs via passive demultiplexing in the passive optical network, and at least one receiver at the optical line terminal for receiving and processing an upstream signal from said users, said upstream signal distributed over the passive optical network.

2. The optical line terminal according to claim 1, wherein the wavelength division multiplexed (WDM) downstream optical carrier signal defines a first range of optical wavelengths and wherein the WDM downstream optical data signal defines a second range of wavelengths, and wherein said first and second ranges of wavelengths are separated by at least 50 nm, or at least 100 nm, or at least 200 nm.

3. The optical line terminal according to claim 2, wherein the first range of wavelengths is centred around approx. 1300 nm, and wherein the second range of wavelengths is centred around approx. 1500 nm or 1550 nm.

4. The optical line terminal according to claim 1, wherein the WDM downstream optical carrier signal defines a range of optical carrier signal wavelengths, and wherein the WDM downstream optical data signal defines a range of optical data signal wavelengths, and wherein said at least first transmitter is configured for generating an optical carrier signal wavelength of the range of optical carrier signal wavelengths corresponding to each optical data signal wavelength of the range of optical data signal wavelengths, thereby generating optical carrier signal wavelengths and optical data signal wavelengths in respective pairs with a predefined frequency difference between each optical carrier signal wavelength and optical data signal wavelength in each respective pair, and wherein said frequency difference corresponds to a RF frequency for wireless communication.

5. The optical line terminal according to claim 4, wherein the WDM downstream optical carrier signal and the WDM downstream optical data signal are generated by the same time-lens based optical signal processor.

6. The optical line terminal according to claim 5, wherein a TDM data signal is generated with every second TDM tributary carrier before the time-lens optical signal processor, which will then generate the same WDM data channel and WDM carrier channel such that a frequency difference between each data channel and the carrier channel is $\Delta f = \Delta t \cdot K/2\pi$, where $\Delta t$ is the temporal spacing between a data TDM tributary and an adjacent TDM tributary.

7. The optical line terminal according to claim 1, wherein said at least second transmitter is configured for generating a time division multiplexed (TDM) optical data signal, said at least second transmitter comprising a second time lens optical signal processor configured to convert the TDM optical data signal to said WDM downstream optical data signal.

8. The optical line terminal according to claim 1, wherein the at least one receiver comprises an upstream time lens optical signal processor configured to convert an upstream WDM data signal received from said users to an upstream TDM data signal, and at least one TDM receiver for demultiplexing and processing the upstream TDM data signal.

9. The optical line terminal according to claim 1, wherein the WDM downstream optical data signal comprises N signal wavelengths, and wherein said at least second transmitter comprises a multi-wavelength time and wavelength division multiplexed array configured to generate a time division multiplexed downstream optical data signal at M different wavelengths, and where M is less than the number N of signal wavelengths in the WDM downstream optical data signal.

10. The optical line terminal according to claim 9, wherein the at least one receiver comprises a multi-wavelength time and wavelength division multiplexed array configured to receive and process a TDM upstream optical signal at M different wavelengths.

11. A passive optical network (PON) system comprising the optical line terminal according to claim 1 and an optical fiber infrastructure for distributing the downstream and upstream signals.

12. The passive optical network (PON) system according to claim 11, further comprising
the plurality of optical network units (ONU),
at least one remote node for splitting the WDM downstream optical data signal and the WDM downstream optical carrier signal into separate wavelength signals such that each ONU receives a downstream optical data signal at a first specific wavelength and a downstream optical carrier signal at a second specific wavelength.

13. The PON system according to claim 12, wherein each ONU is colourless/wavelength independent.

14. The PON system according to claim 12, wherein each ONU comprises a coupling element for separating the optical carrier signal and the downstream optical data signal, a receiver for receiving and processing the downstream optical data signal and an upstream signal generator for receiving and modulating the optical carrier signal, thereby generating an upstream optical data signal.

15. The PON system according to claim 14, wherein the upstream signal generator comprises a reflective semiconductor optical amplifier and/or an optical circulator, amplifier and modulator for receiving, amplifying and modulating the optical carrier signal.

16. The passive optical network (PON) system according to claim 11, comprising
the plurality of optical network units (ONU),
at least one remote node for splitting the WDM downstream optical data signal and the WDM downstream optical carrier signal into separate wavelength signals such that each ONU receives a downstream optical data signal at a first specific wavelength and a downstream optical carrier signal at a second specific wavelength,
wherein said ONU's are configured for generating a radio frequency (RF) data signal for wireless communication based on the frequency difference between the first and second wavelengths.

17. The passive optical network (PON) system according to claim 16, wherein a part of each optical carrier signal is used for generating said RF data signal and another part of said optical carrier signal is used for generation of an upstream optical data signal.

* * * * *